(12) United States Patent
Nakai et al.

(10) Patent No.: US 11,976,230 B2
(45) Date of Patent: May 7, 2024

(54) PHOTORESPONSIVE MATERIAL, ADHESIVE, OPTICAL SWITCHING MATERIAL, TONER, AND IMAGE FORMING METHOD

(71) Applicant: Konica Minolta, Inc., Tokyo (JP)

(72) Inventors: Yukiko Nakai, Toyohashi (JP); Kouji Sugama, Musashino (JP); Haruo Horiguchi, Koganei (JP); Toyoko Shibata, Tokyo (JP); Hirofumi Hayata, Fuchu (JP)

(73) Assignee: Konica Minolta, Inc., Tokyo (JP)

( * ) Notice: Subject to any disclaimer, the term of this patent is extended or adjusted under 35 U.S.C. 154(b) by 90 days.

(21) Appl. No.: 17/225,724

(22) Filed: Apr. 8, 2021

(65) Prior Publication Data
US 2021/0332272 A1 Oct. 28, 2021

(30) Foreign Application Priority Data

Apr. 24, 2020 (JP) .................................. 2020-077690
Aug. 7, 2020 (JP) .................................. 2020-135373

(51) Int. Cl.
| | |
|---|---|
| C09K 19/24 | (2006.01) |
| G02F 1/00 | (2006.01) |
| G03C 1/73 | (2006.01) |
| C08K 5/23 | (2006.01) |
| G03G 9/08 | (2006.01) |

(52) U.S. Cl.
CPC ............ *C09K 19/24* (2013.01); *G02F 1/0063* (2013.01); *G03C 1/733* (2013.01); *C08K 5/23* (2013.01); *G03G 9/08* (2013.01)

(58) Field of Classification Search
CPC ......... C09K 19/24; C08K 5/23; G02F 1/0063; G03C 1/733; G03G 9/08
USPC ...................................................... 528/170
See application file for complete search history.

(56) References Cited

U.S. PATENT DOCUMENTS

| | | | |
|---|---|---|---|
| 2006/0286311 A1 | 12/2006 | Okazaki et al. | |
| 2013/0066068 A1 | 3/2013 | Norikane et al. | |
| 2015/0159058 A1 | 6/2015 | Akiyama et al. | |
| 2019/0202194 A1* | 7/2019 | Ikeda | B41M 1/08 |
| 2020/0073269 A1 | 3/2020 | Takahashi et al. | |
| 2020/0263088 A1* | 8/2020 | Horiguchi | C09K 19/24 |

(Continued)

FOREIGN PATENT DOCUMENTS

| | | |
|---|---|---|
| CN | 109134748 A | 1/2019 |
| EP | 3355120 A1 | 8/2018 |
| JP | 2007017960 A | 1/2007 |

(Continued)

OTHER PUBLICATIONS

Ito et al., "Light-Induced Reworkable Adhesives Based on ABA-type Triblock Copolymers with Azopolymer Termini", ACS Applied Materials & Interfaces, 2018, vol. 10, pp. 32649-32658.

(Continued)

*Primary Examiner* — Ruiyun Zhang
(74) *Attorney, Agent, or Firm* — RANKIN, HILL & CLARK LLP

(57) ABSTRACT

A composition includes an isomerized polymer containing a structural unit containing an isomerized structure and an isomerized low molecular weight compound, the composition being fluidized by light irradiation from a solid state and being reversibly non-fluidized.

14 Claims, 2 Drawing Sheets

(56) References Cited

U.S. PATENT DOCUMENTS

2020/0264530 A1* 8/2020 Kusano .............. C09K 19/22

FOREIGN PATENT DOCUMENTS

| | | |
|---|---|---|
| JP | 2011-256155 A | 12/2011 |
| JP | 2011-256291 A | 12/2011 |
| JP | 2016-124886 A | 7/2016 |
| JP | 2018-72767 A | 5/2018 |
| JP | 20181248387 A | 8/2018 |
| JP | 2019-3009 A | 1/2019 |
| WO | 2013168712 A1 | 11/2013 |
| WO | 2014/157331 A1 | 10/2014 |

OTHER PUBLICATIONS

Dufresne et al., "Optoelectronic property tailoring of conjugated heterocyclic azomethines—the effect of pyrrole, hiophene and furans", Journal of Physics Organic Chemistry, 2011, vol. 25, pp. 211-221.
Extended European Search Report (EESR) dated Sep. 20, 2021 for European Patent Application No. 21168557.3.
Chinese Office Action (CNOA) dated May 27, 2023 and issued in Chinese Patent Application No. 202110424280.9 and its English machine translation.
Japanese Office Action (JPOA) dated Mar. 19, 2024 for Japanese Patent Application No. 2020-135373; English translation.

\* cited by examiner

PHOTORESPONSIVE MATERIAL, ADHESIVE, OPTICAL SWITCHING MATERIAL, TONER, AND IMAGE FORMING METHOD

The entire disclosure of Japanese patent Application No. 2020-077690, filed on Apr. 24, 2020, is incorporated herein by reference in its entirety.

BACKGROUND

Technological Field

The present invention relates to a composition as a photoresponsive material that is fluidized by light irradiation and reversibly non-fluidized, an adhesive using the composition, an optical switching material using the composition, a toner using the composition, and an image forming method using the toner.

Description of the Related Art

A photoresponsive liquid crystal material is known as a material that changes fluidity thereof by light irradiation. For example, JP 2011-256155 A and JP 2011-256291 A each propose a polymer liquid crystal material using an azobenzene derivative. The polymer liquid crystal material undergoes a cis-trans isomerization reaction at an azobenzene moiety in response to light. It is considered that a change in molecular structure due to the cis-trans isomerization reaction induces a phase transition from a solid state to a fluid state. In addition, by irradiating the material with light again by changing the wavelength, heating the material, or leaving the material in a dark place at room temperature, a reverse reaction occurs, and the material is solidified again.

However, for the phase change of each of the azobenzene derivatives described in JP 2011-256155 A and JP 2011-256291 A from a highly regular solid state to a fluid state, a sufficient amount of light energy for collapsing the regular structure is required. These azobenzene derivatives are inefficient in propagating a structural change due to photoisomerization, and therefore require a large amount of energy due to light irradiation to be fluidized.

SUMMARY

Therefore, an object of the present invention is to provide a photoresponsive material that is fluidized by light irradiation and reversibly non-fluidized, the material exhibiting more efficient fluidization/non-fluidization, that is, suppressing required energy.

To achieve the abovementioned object, according to an aspect of the present invention, a composition reflecting one aspect of the present invention comprises: an isomerized polymer containing a structural unit containing an isomerized structure and an isomerized low molecular weight compound, the composition being fluidized by light irradiation from a solid state and being reversibly non-fluidized.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
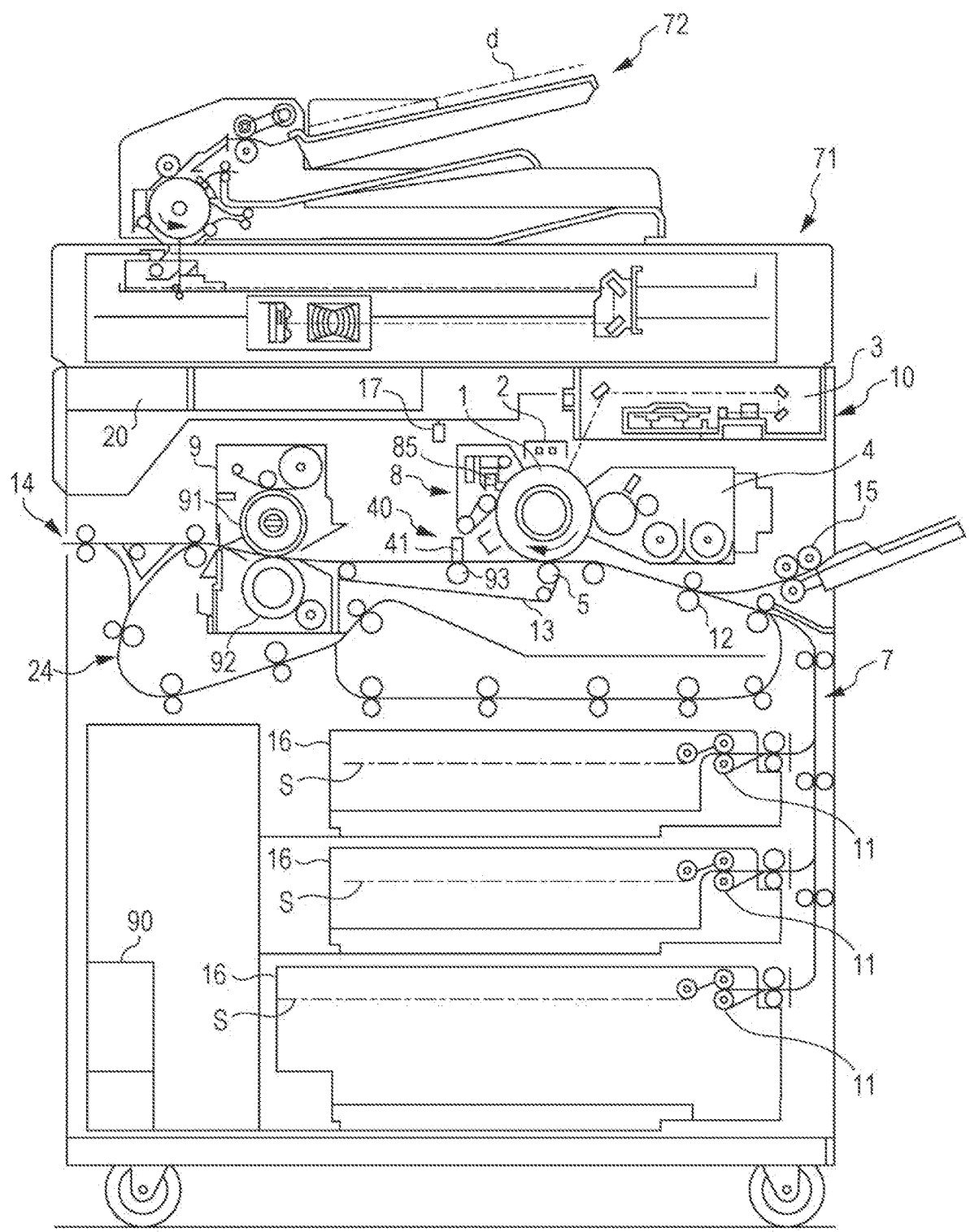
FIG. 1 is a schematic configuration diagram illustrating an image forming apparatus used in an image forming method according to an embodiment of the present invention.

Hereinafter, one or more embodiments of the present invention will be described with reference to the drawings. However, the scope of the invention is not limited to the disclosed embodiments.

An embodiment of the present invention provides a composition containing an isomerized polymer containing a structural unit containing an isomerized structure and an isomerized low molecular weight compound, the composition being fluidized by light irradiation from a solid state and being reversibly non-fluidized.

An embodiment of the present invention can provide a composition exhibiting efficient fluidization/non-fluidization by photoisomerization, that is, a composition suppressing required energy.

Details of why the composition according to an embodiment of the present invention has the above effect are unknown, but the following mechanism can be considered. Note that the following mechanism is speculative, and the present invention is not limited to the following mechanism.

A polymer containing a structural unit containing an isomerized structure can induce a reversible fluidization/non-fluidization phenomenon because the isomerized structure absorbs light, and thermal energy released in a photo-excitation/deactivation process is transmitted (photothermal conversion) to repeating units (structural units) bonded. In particular, when the isomerized structure in the polymer is derived from a trans form of a molecule exhibiting cis-trans photoisomerization, in addition to the above-described photothermal conversion, trans-cis photoisomerization easily occurs by light irradiation, and a cis form having a low Tg is easily generated. It is considered that a more efficient fluidization/non-fluidization phenomenon can be induced by a phase transition change caused by collapse of the regular structure due to photoisomerization.

When a polymer containing such an isomerized structure as described above is mixed with an isomerized low molecular weight compound, in a case where the polymer contains the isomerized structure as a polymer side chain, it is considered that the isomerized low molecular weight compound enters a gap space of the isomerized structure as a side chain and forms a π-π stack. It is considered that a structure changes due to isomerization of the isomerized structure of the polymer by light irradiation, the isomerized low molecular weight compound forming the π-π stack thereby deviates from the regular structure, isomerization of the isomerized structure more easily occurs due to a free space created by the deviation, and more efficient collapse of the regular structure, that is, a fluidization phenomenon can be induced.

Furthermore, when the isomerized low molecular weight compound is a trans form in a compound exhibiting cis-trans photoisomerization, photoisomerization easily occurs by light irradiation, and a change to a cis form makes deviation from the regular structure due to the π-π stack easy. It is considered that this creates a free space in the polymer side chain, makes it easier to induce a structural change in the isomerized structure of the polymer side chain, and can induce a more efficient fluidization phenomenon. In addition, by mixing the isomerized low molecular weight compound with the isomerized polymer, a material having better toughness can be obtained than a material containing only the isomerized low molecular weight compound.

Hereinafter, preferable embodiments of the present invention will be described. Note that here, "X to Y" indicating a range means "X or more and Y or less". Here, unless otherwise specified, operation and measurement of physical properties and the like are performed under conditions of room temperature (20 to 25° C.)/relative humidity 40 to 50% RH.

[Composition that is Fluidized by Light Irradiation and Reversibly Non-Fluidized]

Here, "a substance is fluidized by light irradiation and reversibly non-fluidized" means that a substance changes from a non-fluid state to a fluid state by light irradiation and further returns to the non-fluid state. That is, the composition according to an embodiment of the present invention is in a non-fluid solid state at normal temperature under normal pressure without light irradiation, and is softened by light irradiation to change to a fluid state. By stopping light irradiation and leaving the composition in a dark place at room temperature or under visible light irradiation, or heating the composition, the composition returns to the non-fluid solid state. Here, the fluid state means a state in which a substance is deformed with a small external force.

Specific forms of the isomerized polymer and the isomerized low molecular weight compound that can be used in the composition according to an embodiment of the present invention will be described later. However, the isomerized polymer used in the composition according to an embodiment of the present invention preferably contains a polymer containing a structural unit derived from an azobenzene derivative or a structural unit derived from an azomethine derivative, and the isomerized low molecular weight compound preferably contains an azobenzene compound or an azomethine compound.

The azobenzene derivative and the azomethine derivative each undergo a cis-trans isomerization reaction by light irradiation, and this change in molecular structure induces a phase transition from a solid state to a fluid state. In addition, after the light irradiation is stopped, by leaving the azobenzene derivative and the azomethine derivative in a dark place at room temperature or under visible light irradiation, or heating the azobenzene derivative and the azomethine derivative, the azobenzene derivative and the azomethine derivative are reversibly non-fluidized (resolidified). Therefore, by using the azobenzene derivative (azobenzene compound) or the azomethine derivative (azomethine compound) and a polymer containing a structural unit derived from the azobenzene derivative or the azomethine derivative, fluidization by light irradiation and reversible non-fluidization can more effectively occur.

For the composition according to an embodiment of the present invention, a polymer containing a structural unit derived from an azobenzene derivative and an azobenzene compound may be used in combination, or a polymer containing a structural unit derived from an azomethine derivative and an azomethine compound may be used in combination. At this time, the azobenzene derivative contained in the structural unit of the polymer and the azobenzene compound may have the same structure as or different structures from each other. The azomethine derivative contained in the structural unit of the polymer and the azomethine compound may have the same structure as or different structures from each other.

In addition, for the composition according to an embodiment of the present invention, a polymer containing a structural unit derived from an azobenzene derivative and an azomethine compound may be used in combination, or a polymer containing a structural unit derived from an azomethine derivative and an azobenzene compound may be used in combination.

Furthermore, a polymer containing a structural unit derived from an azobenzene derivative and a polymer containing a structural unit derived from an azomethine derivative may be used in combination, or a polymer containing a structural unit derived from an azobenzene derivative and a structural unit derived from an azomethine derivative may be used.

Note that the ratio of the polymer containing a structural unit derived from an azobenzene derivative or a structural unit derived from an azomethine derivative with respect to the total mass of the isomerized polymer contained in the composition according to an embodiment of the present invention is preferably 90% by mass or more, more preferably 95% by mass or more, and still more preferably 98% by mass or more. The total amount of an azobenzene compound and an azomethine compound with respect to the total mass of the isomerized low molecular weight compound contained in the composition according to an embodiment of the present invention is preferably 90% by mass or more, more preferably 95% by mass or more, and still more preferably 98% by mass or more.

[Isomerized Low Molecular Weight Compound]

The isomerized low molecular weight compound used in the composition according to an embodiment of the present invention is fluidized by light irradiation and reversibly non-fluidized, and has a molecular weight of less than 1000.

The molecular weight of the isomerized low molecular weight compound is preferably 100 or more and less than 1000, and more preferably 100 or more and 800 or less. Note that the isomerized low molecular weight compound does not contain a polymer. In a preferable embodiment, the isomerized low molecular weight compound contains no repeating unit. In a preferable embodiment, the isomerized low molecular weight compound is not obtained by polymerizing a monomer containing a polymerizable group.

The isomerized low molecular weight compound preferably exhibits photoisomerization. Examples thereof include a compound that exhibits a cis-trans isomerization reaction by light irradiation. As such a compound that exhibits a cis-trans isomerization reaction by light irradiation, an azobenzene derivative (azobenzene compound) and an azomethine derivative (azomethine compound) are preferable. Note that here, the azobenzene derivative (azobenzene compound) includes azobenzene.

(Azobenzene Derivative)

The azobenzene derivative (azobenzene compound) used in the present invention is not particularly limited, but a preferable embodiment of the azobenzene derivative is an azobenzene derivative represented by the following chemical formula (1) because of having a high softening rate by light irradiation and having excellent image fixability when the azobenzene derivative is used for a toner.

[Chemical formula 1]

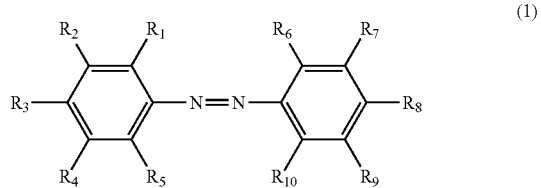

In the above chemical formula (1), $R_1$ to $R_{10}$ are each independently selected from the group consisting of a hydrogen atom, an alkyl group, an alkoxy group, a halogen group, a hydroxy group, and a carboxy group, at least two of $R_1$ to $R_{10}$ are selected from the group consisting of an alkyl group, an alkoxy group, a halogen group, a hydroxy group, and a carboxy group, at least one of $R_1$ to $R_5$ is preferably an alkyl group or an alkoxy group having 1 to 18 carbon atoms, and at least one of $R_6$ to $R_{10}$ is preferably an alkyl group or an alkoxy group having 1 to 18 carbon atoms.

In the above chemical formula (1), at least one of $R_3$ and $R_8$ is preferably an alkyl group having 1 to 18 carbon atoms or an alkoxy group having 1 to 18 carbon atoms. That is, a preferable embodiment of the azobenzene derivative used in the present invention is an azobenzene derivative having a phenyl group having an alkyl group having 1 to 18 carbon atoms or an alkoxy group having 1 to 18 carbon atoms at a para position with respect to a nitrogen-nitrogen double bond. When at least one of $R_3$ and $R_8$ is an alkyl group or an alkoxy group within the above carbon number range, a trans form exhibits intermolecular packing (n-n interaction) due to an aromatic ring, and exhibits high thermal motility when the trans form is isomerized to a cis form. Therefore, it is considered that a fluidization phenomenon is easy induced.

Above all, $R_3$ and $R_8$ are each independently preferably an alkyl group having 1 to 18 carbon atoms or an alkoxy group having 1 to 18 carbon atoms from a viewpoint of further enhancing fixability of an image when the azobenzene derivative is used for a toner. As described above, by having an alkyl group having 1 to 18 carbon atoms or an alkoxy group having 1 to 18 carbon atoms at each of para positions of two benzene rings, thermal motility of a molecule is increased, and as described above, isotropic melting easily occurs in a chained manner throughout the system. At this time, $R_3$ and $R_5$ may be the same as or different from each other, but are preferably the same as each other for ease of synthesis. The alkyl group or alkoxy group having 1 to 18 carbon atoms used in $R_3$ and $R_8$ may be linear or branched, but is preferably linear from a viewpoint of constituting a structure of a rod-shaped molecule that easily causes light phase transition.

Above all, $R_3$ and $R_8$ are each independently preferably an alkyl group or an alkoxy group having 6 to 12 carbon atoms. When $R_3$ and $R_8$ are each an alkyl group or an alkoxy group within the above carbon number range, an alkyl-alkyl interaction acting between molecules is relatively weak while having high thermal motility. Therefore, the crystals easily collapse, cis-trans isomerization more easily proceeds, and a softening rate by light irradiation and fixability of an image when the azobenzene derivative is used for a toner are further enhanced.

In the above chemical formula (1), at least one of $R_1$, $R_2$, $R_4$, $R_5$, $R_6$, $R_7$, $R_9$, and $R_{10}$ is preferably selected from the group consisting of an alkyl group, an alkoxy group, a halogen group, a hydroxy group, and a carboxy group (hereinafter, also simply referred to as a substituent). With such a structure, a lattice defect that advantageously acts on cis-trans isomerization is formed, a free volume appears, and a n-n interaction is reduced. Therefore, cis-trans isomerization more easily proceeds, and a softening rate by light irradiation and fixability of an image are further enhanced. Above all, at least one of $R_1$, $R_2$, $R_4$, $R_5$, $R_6$, $R_7$, $R_9$, and $R_{10}$ is more preferably an alkyl group or an alkoxy group having 1 to 4 carbon atoms, which may be branched, or a halogen group from a viewpoint of ensuring a free volume required for cis-trans isomerization, still more preferably an alkyl group having 1 to 4 carbon atoms, and further still more preferably a methyl group from a viewpoint of further enhancing the fixability of an image.

In the above chemical formula (1), the number of substituents in each of $R_1$, $R_2$, $R_4$, $R_5$, $R_6$, $R_7$, $R_9$, and $R_{10}$ is preferably 1 to 8, and more preferably 1 to 6. Above all, the number of substituents in each of $R_1$, $R_2$, $R_4$, $R_5$, $R_6$, $R_7$, $R_9$, and $R_{10}$ is still more preferably 1 to 4, and particularly preferably 1 to 3 from a viewpoint of not lowering the melting point of the azobenzene derivative too much and further enhancing the heat-resistant storage property of a toner.

A position where a substituent is present in $R_1$, $R_2$, $R_4$, $R_5$, $R_6$, $R_7$, $R_9$, and $R_{10}$ is not particularly limited. However, a substituent is preferably present in at least one of $R_2$, $R_4$, $R_7$, and $R_9$ in the above chemical formula (1), and a methyl group is more preferably present in at least one of $R_2$, $R_4$, $R_7$, and $R_9$ in the above chemical formula (1). Since the azobenzene derivative having such a structure has a higher softening rate by light irradiation, the fixability of an image is enhanced, and the melting point is appropriately raised. Therefore, the heat-resistant storage property of a toner is also enhanced.

The azobenzene derivative is preferably, for example, a compound obtained by replacing hydrogen atoms added to a benzene ring with one, two, or three substituents selected from the group consisting of an alkyl group, an alkoxy group, a halogen group, a hydroxy group, and a carboxy group in a 4,4'-dialkylazobenzene in which $R_3$ and $R_8$ in chemical formula (1) are each an alkyl group having 1 to 18 carbon atoms, such as 4,4'-dihexylazobenzene, 4,4'-dioctylazobenzene, 4,4'-didecylazobenzene, 4,4'-didodecylazobenzene, or 4,4'-dihexadecylazobenzene; or in a 4,4'-bis(alkoxy) azobenzene in which $R_3$ and $R_8$ in chemical formula (1) are each an alkoxy group having 1 to 18 carbon atoms, such as 4,4'-bis(hexyloxy) azobenzene, 4,4'-bis(octyloxy) azobenzene, 4,4'-bis(dodecyloxy) azobenzene, or 4,4'-bis(hexadecyloxy) azobenzene. More specific examples of the azobenzene derivative include the following azobenzene derivatives (1) to (12).

[Chemical formula 2-1]

Azobenzene derivative

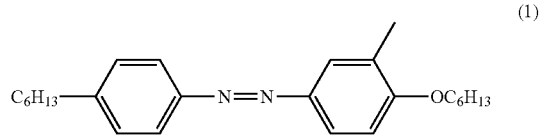

(1)

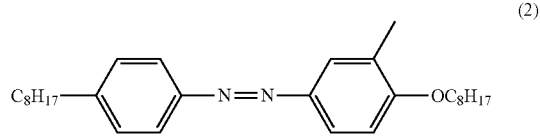

(2)

-continued (3)
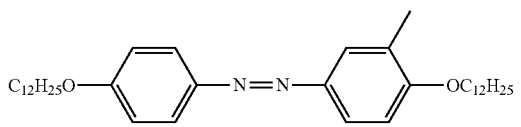

(4)
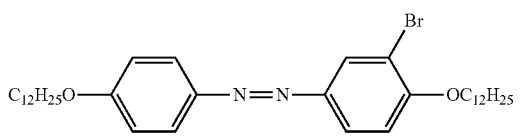

(5)
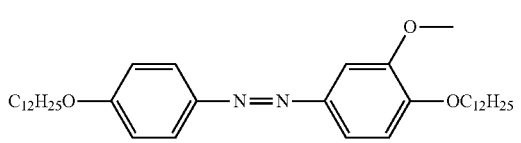

(6)
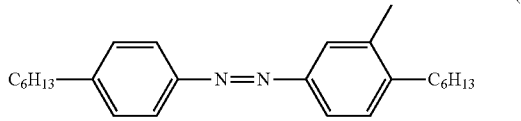

(7)
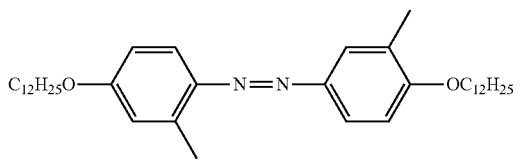

[Chemical formula 2-2]

(8)

(9)
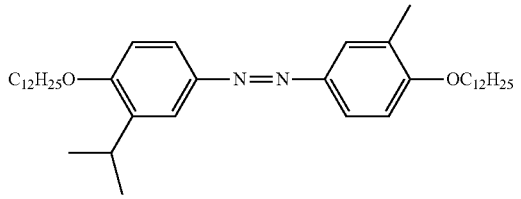

(10)
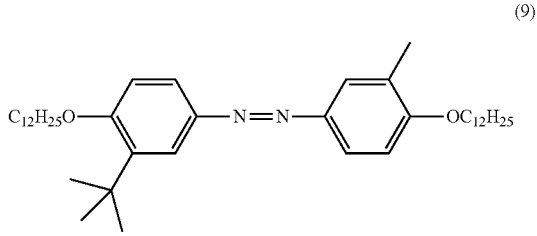

(11)
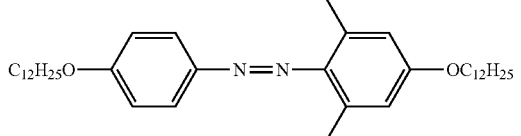

(12)
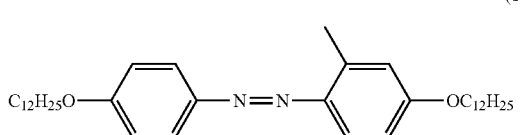

A method for synthesizing the azobenzene derivative is not particularly limited, and a conventionally known synthesis method can be applied.

For example, as illustrated in the following reaction formula A, the above azobenzene derivative (1) can be obtained by reacting 4-aminophenol with sodium nitrite under cooling to generate a diazonium salt, reacting the diazonium salt with o-cresol to synthesize intermediate A (first stage), and then allowing n-bromohexane to act on intermediate A.

[Chemical formula 3]

(Reaction formula A)

First stage

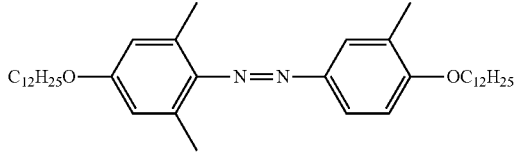

Intermediate A

Second stage

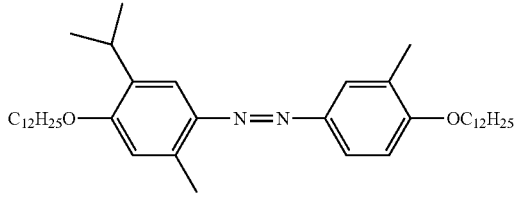

Intermediate A

Azobenzene derivative (1)

By changing the raw materials (4-aminophenol, o-cresol, and/or n-bromohexane) used in the above reaction formula A to other compounds, a desired azobenzene derivative can be obtained. According to the above manufacturing method, an azobenzene derivative having an asymmetric structure can be easily obtained.

For example, as illustrated in the following reaction formula B, by changing o-cresol and n-bromohexane to 2-bromophenol and n-bromododecane, respectively, azobenzene derivative (4) can be obtained.

[Chemical formula 4]

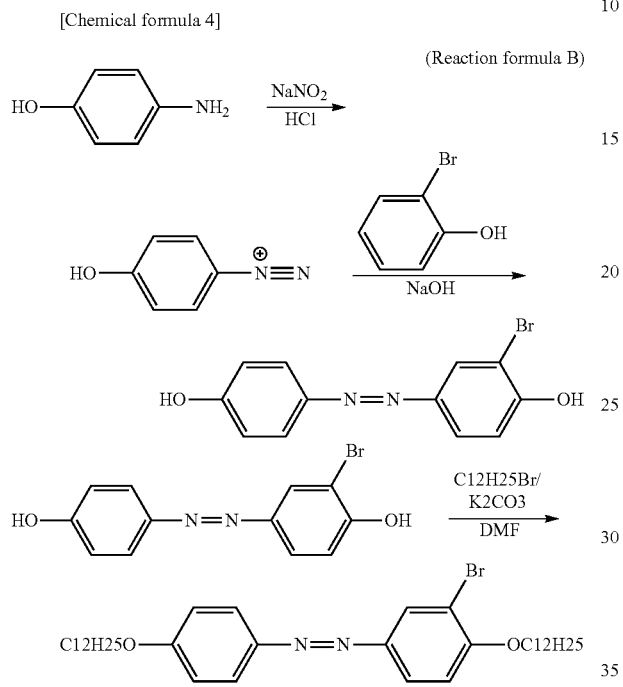

As illustrated in the following reaction formula C, by reacting azobenzene derivative (4) with methanol in the presence of a Pd catalyst and a base, azobenzene derivative (5) can be obtained.

[Chemical formula 5]

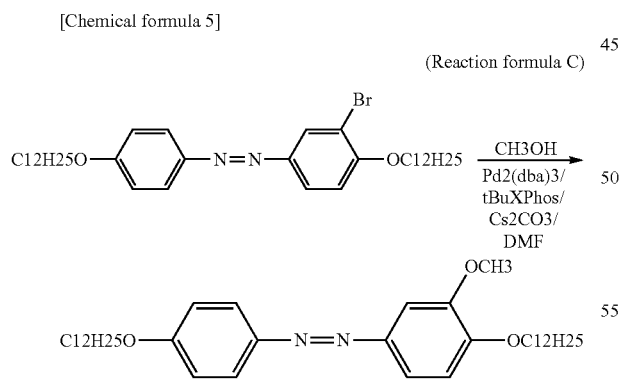

Alternatively, for example, as illustrated in the following reaction formula D, by reacting manganese dioxide, which is an oxidizing agent, with p-hexylaniline to synthesize 4,4'-dihexylazobenzene, and then reacting 4,4'-dihexylazobenzene with N-bromosuccinimide, and reacting the resulting product with methylboronic acid in the presence of a Pd catalyst and a base, azobenzene derivative (6) can be obtained.

[Chemical Formula 6]

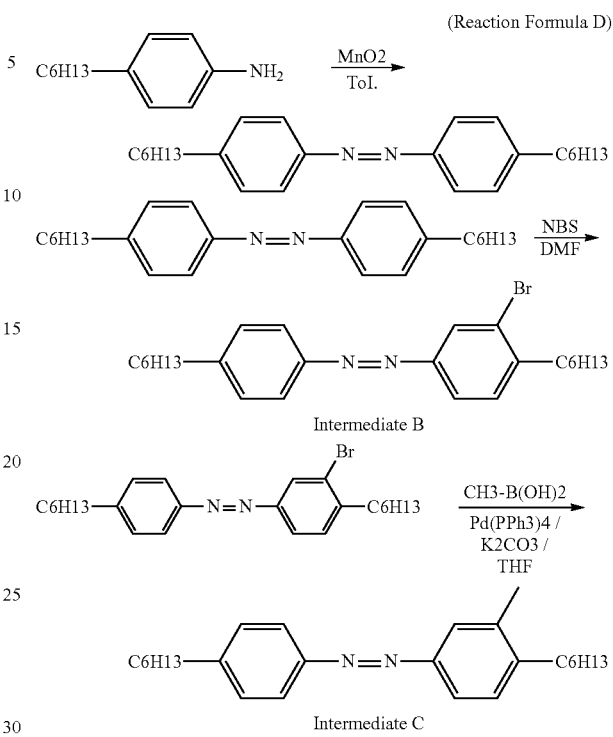

By changing the raw materials (p-hexylaniline and/or methylboronic acid) used in the above reaction formula D to other compounds, a desired azobenzene derivative can be synthesized.

The azobenzene derivatives can be used singly or in combination of two or more types thereof.

(Azomethine Derivative)

The azomethine derivative (azomethine compound) suitably used as the isomerized low molecular weight compound has an aromatic hydrocarbon group or an aromatic heterocyclic group at each end of a C=N bond, and has activation energy Ea of cis-trans isomerization of 60 kJ/mol or more.

In a photoresponsive compound represented by the following general formula (1), the activation energy Ea of cis-trans isomerization is a difference between the total energy of the compound in a transition state represented by the following general formula (2) and the total energy of a cis form represented by the following general formula (3).

[Chemical formula 7]

General formula (1)

[Chemical formula 8]

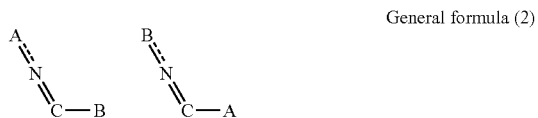

General formula (2)

General formula (3)

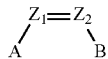

In general formula (1), $Z_1$ and $Z_2$ are each independently N or CH, and $Z_1 \neq Z_2$, and A and B are each independently an aromatic hydrocarbon group with or without a substituent, or an aromatic heterocyclic group with or without a substituent.

When the activation energy Ea of cis-trans isomerization is 60 kJ/mol or more, a barrier of isomerization reaction from a cis form to a trans form is sufficiently high, and it is possible to suppress rapid return to the trans form after isomerization to the cis form by light irradiation. Therefore, a fluidization phenomenon by light irradiation can be induced, and furthermore, reversible non-fluidization can be achieved.

The activation energy Ea is preferably 63 kJ/mol or more, more preferably 64 kJ/mol or more, and still more preferably 65 kJ/mol or more. The activation energy Ea is preferably 100 kJ/mol or less, more preferably 95 kJ/mol or less, and still more preferably 90 kJ/mol or less from a viewpoint of ease of returning to a trans form.

Here, for calculating the molecular structure of the cis form of the azomethine derivative, the total energy of the cis form, the molecular structure of the azomethine derivative in a transition state, and the total energy of the azomethine derivative in the transition state, software of Gaussian 16 manufactured by U.S. Gaussian Inc. (Revision B.01, M. J. Frisch, G. W. Trucks, H. B. Schlegel, G. E. Scuseria, M. A. Robb, J. R. Cheeseman, G. Scalmani, V. Barone, G. A. Petersson, H. Nakatsuji, X. Li, M. Caricato, A. V. Marenich, J. Bloino, B. G. Janesko, R. Gomperts, B. Mennucci, H. P. Hratchian, J. V. Ortiz, A. F. Izmaylov, J. L. Sonnenberg, D. Williams-Young, F. Ding, F. Lipparini, F. Egidi, J. Goings. B. Peng, A. Petrone, T. Henderson, D. Ranasinghe, V. G. Zakrzewski, J. Gao, N. Rega, G. Zheng, W. Liang, M. Hada, M. Ehara, K. Toyota, R. Fukuda, J. Hasegawa, M. Ishida, T. Nakajima, Y. Honda, O. Kitao, H. Nakai, T. Vreven, K. Throssell, J. A. Montgomery, Jr., J. E. Peralta, F. Ogliaro, M. J. Bearpark, J. J. Heyd, E. N. Brothers, K. N. Kudin, V. N. Staroverov, T. A. Keith. R. Kobayashi, J. Normand, K. Raghavachari, A. P. Rendell, J. C. Burant, S. S. Iyengar, J. Tomasi, M. Cossi, J. M. Millam, M. Klene, C. Adamo, R. Cammi, J. W. Ochterski, R. L. Martin, K. Morokuma, O. Farkas, J. B. Foresman, and D. J. Fox, Gaussian, Inc., Wallingford CT, 2016.) can be used, and density functional theory (B3LYP/6-31G(d)) can be used as a calculation method. As the molecular structure of the cis form, the most stable molecular structure of an isomer represented by general formula (3), that is, a molecular structure having the lowest total energy is calculated, and this total energy is used as the total energy of the cis form. As the molecular structure in a transition state (TS), a saddle point of a corresponding molecular structure is calculated for a transition state represented by general formula (2), and the total energy obtained at this time is used as the total energy in the transition state. Note that the software and the calculation method are not particularly limited, and similar values can be obtained by using any software and any calculation method. From calculated values obtained in this way, a value of activation energy Ea can be determined by formula (1): Ea (kJ/mol)=(total energy in TS (kJ/mol))−(total energy of cis form (kJ/mol)).

By appropriately selecting the structures of A and B in the above general formula (1), the activation energy Ea represented by formula (1) can be controlled to 60 kJ/mol or more.

Specifically, by introducing an electron-donating structure into a compound having an azomethine moiety, the electron density of the azomethine moiety can be increased, and the activation energy Ea can be increased. For example, by using an aromatic heterocyclic group having a high electron donating property as at least one of A and B, the activation energy Ea can be increased. In addition, by introducing a substituent having a high electron donating property into the aromatic hydrocarbon group or the aromatic heterocyclic group as A or B, the activation energy Ea can be increased.

Here, the aromatic hydrocarbon group is not particularly limited, but an aryl group having 6 to 30 carbon atoms is preferable, and examples thereof include a phenyl group, a naphthyl group, an anthracenyl group, a phenanthrenyl group, and a pyrenyl group. Above all, a phenyl group is preferable because fluidization and non-fluidization effectively occur.

The aromatic heterocyclic group is not particularly limited, but an aromatic heterocyclic group having 2 to 30 carbon atoms is preferable. In addition, an aromatic heterocyclic group having a high electron donating property is preferable, and examples thereof include a thienyl group, a pyrrolyl group, a furanyl group, a pyrazolyl group, an imidazolyl group, a pyridyl group, a pyrimidinyl group, a pyrazinyl group, a triazinyl group, a benzothienyl group, a benzimidazolyl group, an indolyl group, an isoindolyl group, a quinolinyl group, an isoquinolinyl group, a quinazolinyl group, a quinoxalinyl group, a naphthyldinyl group, an acridinyl group, a carbazolyl group, and a dibenzothienyl group, but are not limited thereto. Above all, a thienyl group, a pyrrolyl group, a furanyl group, a pyrazolyl group, an imidazolyl group, an indolyl group, and a carbazolyl group are preferable because the activation energy is high, and fluidization and non-fluidization effectively occur.

Each of the above aromatic hydrocarbon group and aromatic heterocyclic group may have a substituent. The substituent is not particularly limited, but examples thereof include a halogen atom, a cyano group, a nitro group, an amino group, an alkyl group having 1 to 18 carbon atoms, an alkoxy group having 1 to 18 carbon atoms, an alkylamino group having 1 to 10 carbon atoms, a dialkylamino group having 2 to 10 carbon atoms, an acyl group having 2 to 19 carbon atoms, and an alkoxycarbonyl group having 2 to 19 carbon atoms. Preferable examples thereof include a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 19 carbon atoms, and an alkoxycarbonyl group having 2 to 19 carbon atoms.

As described above, the light phase transition of the azomethine derivative is considered to occur by collapse of the crystal structure due to cis-trans isomerization, as in the case of the azobenzene compound. Since the intermolecular π-π interaction is generally strong, the light phase transition occurs only on an extremely outermost surface of the crystal structure. Here, when the aromatic hydrocarbon group or aromatic heterocyclic group represented by A or B in the above general formula (1) has a substituent, the azomethine derivative forms a specific crystal structure in which an isotropically disturbed structure coexists due to a thermal motion of these substituents in a periodic structure in which π-π interaction is dominant. Therefore, when the cis-trans isomerization reaction proceeds locally and the π-π interaction at the azomethine moiety is reduced, isotropic melting occurs in a chained manner throughout the system. Therefore, it is considered that cis-trans isomerization more easily proceeds and fluidization more easily occurs.

In the above general formula (1), A and B are each independently preferably a phenyl group with or without a substituent or an aromatic heterocyclic group with or without a substituent. With such a configuration, fluidization and non-fluidization can more effectively occur.

Another preferable embodiment of the present invention is a compound in which at least one of A and B is a phenyl group having at least one substituent selected from the group consisting of an alkyl group having 1 to 18 carbon atoms, an alkoxy group having 1 to 18 carbon atoms, and a dialkylamino group having 2 to 10 carbon atoms in the above general formula (1). Another preferable embodiment of the present invention is a compound in which one of A and B is a phenyl group having at least one substituent selected from the group consisting of an alkyl group having 1 to 18 carbon atoms, an alkoxy group having 1 to 18 carbon atoms, and a dialkylamino group having 2 to 10 carbon atoms, and the other is an aromatic heterocyclic group with or without a substituent. With the above configuration, the electron density of the azomethine moiety can be increased to control the activation energy, and a fluidization/reversible non-fluidization phenomenon can be effectively induced. In addition, for example, a lattice defect that advantageously acts on cis-trans isomerization is formed, a free volume appears, and a π-π interaction is reduced. Therefore, it is considered that cis-trans isomerization more easily proceeds and fluidization more easily occurs. Here, specific forms of the aromatic heterocyclic group and each substituent are similar to those described above.

In particular, in the above general formula (1), at least one of A and B is preferably a phenyl group having an alkyl group having 1 to 18 carbon atoms or an alkoxy group having 1 to 18 carbon atoms at a para position with respect to the $Z_1$ or $Z_2$. As a result, it is considered that the crystals easily collapse and fluidization by light irradiation more easily occurs.

A preferable embodiment is a compound in which one of A and B is a phenyl group having an alkyl group having 1 to 18 carbon atoms or an alkoxy group having 1 to 18 carbon atoms at a para position with respect to the $Z_1$ or $Z_2$, and the other is a thienyl group, a pyrrolyl group, a pyrazolyl group, a furanyl group, an imidazolyl group, or an indolyl group, with or without a substituent, in the above general formula (1). As a result, fluidization can be achieved with a lower irradiation light intensity. Above all, a compound in which B is a thienyl group, a pyrrolyl group, a pyrazolyl group, a furanyl group, an imidazolyl group, or an indolyl group, with or without a substituent, $Z_1$ is N, and $Z_2$ is CH can have the above effect more remarkably.

As described above, it is considered that the azomethine derivative as the isomerized low molecular weight compound can effectively achieve fluidization and reversible non-fluidization by setting the activation energy of photoisomerization within a predetermined range. Furthermore, by appropriately selecting A, $Z_1$, $Z_2$, and B in the above general formula (1), the magnitude of the intermolecular interaction can be controlled, the photomeltability can be controlled, and the effect of the present invention can be obtained more remarkably.

Examples of the azomethine derivative as the isomerized low molecular weight compound used in the present invention include compounds 1 to 5 and 7 to 10 in which A, $Z_1$, $Z_2$, and B are appropriately selected in general formula (1) illustrated in Table 1 below.

TABLE 1-1

| Compound No. | $Z_1$ | $Z_2$ | $R_1$ | $R_2$ | $R_3$ | $R_4$ | $R_5$ | X | $R_{11}$ | $R_{12}$ | $R_{13}$ | $R_{14}$ |
|---|---|---|---|---|---|---|---|---|---|---|---|---|
| | | | | | A | | | | | B | | |
| 1 | N | CH | H | H | $OC_6H_{13}$ | H | H | S | — | $CH_3$ | H | H |
| 2 | N | CH | H | H | $OC_6H_{13}$ | H | H | $NR_{11}$ | $CH_3$ | H | H | H |
| 3 | N | CH | H | H | $OC_2H_5$ | H | H | $NR_{11}$ | H | $CH_3$ | H | H |
| 4 | N | CH | H | H | $OC_6H_{13}$ | H | H | S | — | $OCH_3$ | H | H. |

TABLE 1-2

| Compound No. | $Z_1$ | $Z_2$ | $R_1$ | $R_2$ | $R_3$ | $R_4$ | $R_5$ | $R_6$ | $R_7$ | $R_8$ | $R_9$ | $R_{10}$ |
|---|---|---|---|---|---|---|---|---|---|---|---|---|
| | | | | | A | | | | | B | | |
| 5 | N | CH | H | H | $OC_{10}H_{21}$ | H | H | H | H | $N(CH_3)_2$ | H | H |
| 6 | N | N | H | $CH_3$ | $OC_6H_{13}$ | H | H | H | H | $OC_6H_{13}$ | H | H |
| 9 | N | CH | H | $CH_3$ | $OC_6H_{13}$ | H | H | H | H | $N(CH_3)_2$ | H | H |

TABLE 1-3

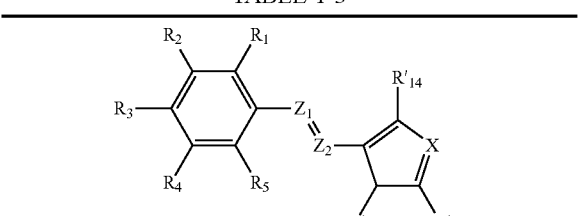

| Compound No. | A | | | | | | B | | | | |
|---|---|---|---|---|---|---|---|---|---|---|---|
| | $Z_1$ | $Z_2$ | $R_1$ | $R_2$ | $R_3$ | $R_4$ | $R_5$ | X | $R_{11}$ | $R_{12}'$ $R_{13}'$ $R_{14}'$ | |
| 7 | N | CH | H | H | $OC_6H_{13}$ | H | H | $NR_{11}$ | H | H | H H |

TABLE 1-4

| Compound No. | A | | | | | | B | | | |
|---|---|---|---|---|---|---|---|---|---|---|
| | $Z_1$ | $Z_2$ | $R_1$ | $R_2$ | $R_3$ | $R_4$ | $R_1$ | $R_{15}$ | $R_{16}$ | $R_{17}$ |
| 8 | N | CH | H | H | $OC_6H_{13}$ | H | H | H | H | H |

TABLE 1-5

| Compound No. | A | | | | | | B | | | |
|---|---|---|---|---|---|---|---|---|---|---|
| | $Z_1$ | $Z_2$ | $R_1$ | $R_2$ | $R_3$ | $R_4$ | $R_1$ | $R_{18}$ | $R_{19}$ | $R_{20}$ |
| 10 | N | CH | H | H | $OC_6H_{13}$ | H | H | H | $CH_3$ | H |

A method for synthesizing the azomethine derivative is not particularly limited, and a conventionally known synthesis method can be applied. For example, in general formula (1), a compound in which $Z_1$ is N, $Z_2$ is CH, A is a 4-hexyloxyphenyl group, and B is a 5-methyl-2-thienyl group can be synthesized by the following scheme 1.

In ethanol (EtOH), 4-(hexyloxy) aniline and 5-methylthiophen-2-carboxyaldehyde are reacted with each other while being heated and stirred. The reaction solution is filtered, the obtained powder is washed with cooling ethanol, and recrystallized with methanol/ethanol to obtain an azomethine compound as a target product (see the following scheme 1). The temperature during heating and stirring is preferably within a range of 0° C. or higher and 100° C. or lower, more preferably within a range of 30° C. or higher and 70° C. or lower, still more preferably within a range of 40° C. or higher and 60° C. or lower.

[Chemical formula 9]

Scheme 1

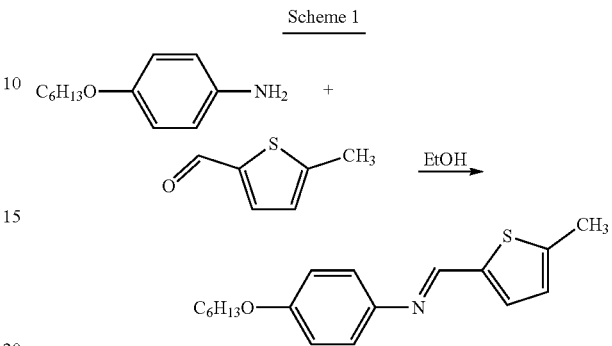

For example, in general formula (1), a compound in which $Z_1$ is N, $Z_2$ is CH, A is a 4-hexyloxyphenyl group, and B is an N-methyl-2-pyrrolyl group can be synthesized by the following scheme 2. For example, a compound in which $Z_1$ and $Z_2$ in these compounds are exchanged can also be appropriately synthesized with reference to the above scheme 1 and the following scheme 2.

In ethanol (EtOH), 4-(hexyloxy) aniline and N-methyl-pyrrole-2-carboxyaldehyde are reacted with each other while being heated and stirred. The reaction solution is filtered, the obtained powder is washed with cooling ethanol, and recrystallized with methanol/ethanol to obtain an azomethine compound, which is a target product (see the following scheme 2). The temperature during heating and stirring is preferably within a range of 0° C. or higher and 100° C. or lower, more preferably within a range of 30° C. or higher and 70° C. or lower, still more preferably within a range of 40° C. or higher and 60° C. or lower.

[Chemical formula 10]

Scheme 2

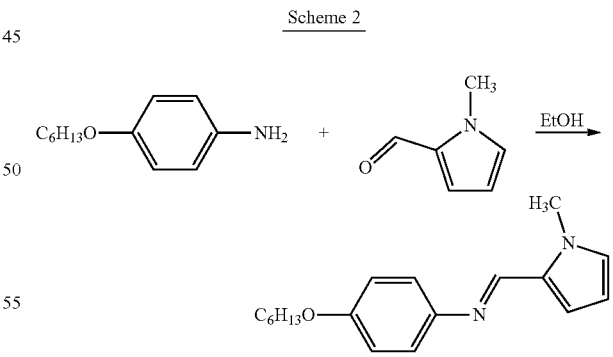

An azomethine derivative other than the above-described azomethine derivatives can also be synthesized by a similar method by appropriately changing the raw materials with reference to the above schemes 1 and 2.

The azomethine derivatives can be used singly or in combination of two or more types thereof.

[Isomerized Polymer]

The isomerized polymer used in the composition according to an embodiment of the present invention is not particularly limited as long as the isomerized polymer is fluidized by light irradiation and reversibly non-fluidized and contains a structural unit containing an isomerized structure. In a preferable embodiment, the isomerized polymer has a structural unit containing an isomerized structure as a repeating unit. In a preferable embodiment, the isomerized polymer has a number average molecular weight of 1000 or more.

The isomerized structure preferably has a molecular structure derived from a compound exhibiting photoisomerization. Examples thereof include a molecular structure derived from a compound that exhibits a cis-trans isomerization reaction by light irradiation. Examples of such a compound that exhibits cis-trans isomerization by light irradiation include an azobenzene derivative and an azomethine derivative, which can be introduced into the isomerized polymer as the isomerized structure. That is, as the isomerized polymer in the composition according to an embodiment of the present invention, a polymer containing a structural unit derived from an azobenzene derivative or a structural unit derived from an azomethine derivative can be used.

(Polymer Containing Structural Unit Derived from Azobenzene Derivative or Structural Unit Derived from Azomethine Derivative)

The polymer containing a structural unit derived from an azobenzene derivative or a structural unit derived from an azomethine derivative preferably has a group represented by any of the following formulas (i) to (iii) as a group having a polymerizable group. Inclusion of any of the following groups each having a polymerizable group is preferable because it is suitable for synthesizing a block copolymer by a living radical polymerization method. Above all, inclusion of the group having a polymerizable group represented by (ii) or (iii) is preferable, and inclusion of the group having a polymerizable group represented by (iii) is more preferable from a viewpoint of ease of softening and melting.

[Chemical formula 11]

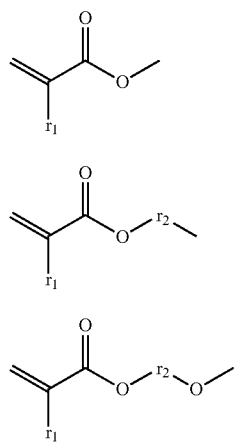

In formulas (i) to (iii), $r_1$s are each independently a hydrogen atom or a methyl group. $r_2$s are each independently an alkylene group having 1 to 18 carbon atoms. $r_2$ is preferably an alkylene group having 3 to 10 carbon atoms. The alkylene group may be linear or branched, and is preferably linear. A part of the alkylene group may be replaced with a substituent. Examples of the substituent include a halogen group, a nitro group, a hydroxy group, and a carboxy group.

The structural unit derived from an azobenzene derivative preferably has a phenylene group having a linker moiety to a polymer main chain at a para position with respect to a nitrogen-nitrogen double bond. By introducing the substituent into the para position with respect to the nitrogen-nitrogen double bond, the crystals easily collapse, photoisomerization easily occurs, and melting or softening can be caused by light irradiation with lower energy. The structural unit derived from an azobenzene derivative is more preferably a structure in which $R_3$ in a compound of chemical formula (1) as the above-described isomerized low molecular weight compound is replaced with the group having a polymerizable group represented by any of the above formulas (i) to (iii). In formula (1), preferable forms of $R_1$, $R_2$, and $R_4$ to $R_{10}$ are similar to those of the compound of formula (1) as an isomerized low molecular weight compound.

At this time, it is preferable to use, as the isomerized polymer, a polymer containing a structural unit derived from an azobenzene derivative containing a phenylene group having a linker moiety to a polymer main chain at a para position with respect to a nitrogen-nitrogen double bond, and to use, as the isomerized low molecular weight compound, an azobenzene derivative or an azomethine derivative having a phenyl group having an alkyl group having 1 to 18 carbon atoms or an alkoxy group having 1 to 18 carbon atoms at a para position with respect to a nitrogen-nitrogen double bond or a carbon-nitrogen double bond. By using these compounds, the effect that the crystals easily collapse and the photomeltability is improved can be obtained more remarkably. Therefore, fluidization by light irradiation can be performed more efficiently.

In the polymer used in the present invention, the structural unit derived from an azomethine derivative preferably has a structure in which a compound in which A is represented by general formula (2a) in a polymer represented by the following general formula (1a) and a hydrogen atom bonded is bonded instead of the oxygen atom bonded to A has activation energy Ea represented by the following formula (1a) of 60 kJ/mol or more.

[Chemical formula 12]

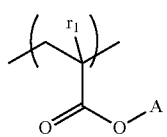

General formula (1a)

In general formula (1a), $r_i$ is a hydrogen atom or a methyl group, and

A is a group having an azomethine structure represented by the following general formula (2a).

[Chemical formula 13]

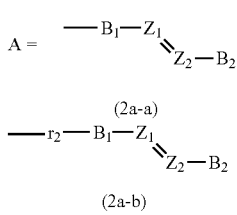

General formula (2a)

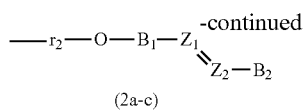

(2a-c)

In general formula (2a). $Z_1$ and $Z_2$ are each independently N or CH, $Z_1 \neq Z_2$, $B_1$ is a divalent aromatic hydrocarbon group with or without a substituent or a divalent aromatic heterocyclic group with or without a substituent, $B_2$ is a monovalent aromatic hydrocarbon group with or without a substituent or a monovalent aromatic heterocyclic group with or without a substituent, and $r_2$ is an alkylene group having 1 to 18 carbon atoms.

$Ea$(kJ/mol)=(total energy in $TS$(kJ/mol))−(total energy of cis form(kJ/mol))  Formula (1a):

In the above formula (1a), TS refers to a transition state represented by general formula (3a), and the cis form refers to an isomer represented by general formula (4a).

[Chemical formula 14]

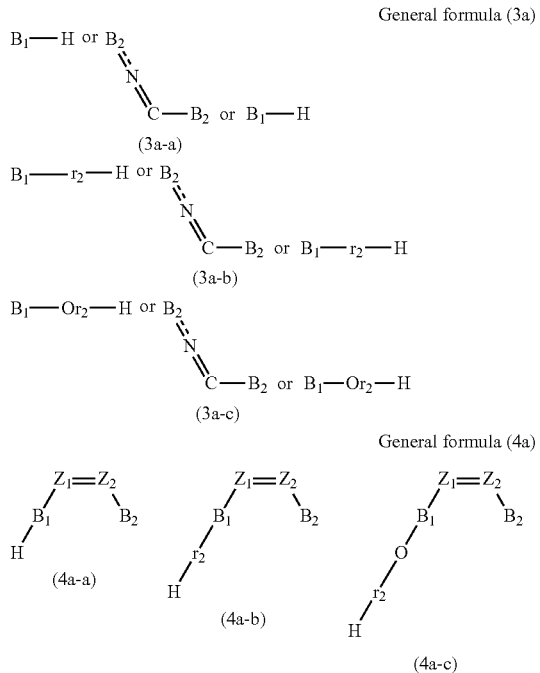

General formula (3a)

(3a-a)

(3a-b)

(3a-c)

General formula (4a)

(4a-a)

(4a-b)

(4a-c)

When an energy barrier (activation energy Ea) in an isomerization reaction from a cis form to a trans form of the compound in which a hydrogen atom is bonded to the structure represented by the above general formula (2a) is 60 kJ/mol or more, a reaction rate of the isomerization reaction from the cis form to the trans form is reduced, the amount of the cis form during light irradiation is increased, and the fluidization caused by the photoisomerization reaction can be induced more effectively.

In addition, when isomerization from a trans form to a cis form occurs while an azomethine group moiety exhibits intermolecular packing (π-π interaction), high thermal motility is exhibited. Therefore, it is considered that the fluidization phenomenon is easily induced while the strength as a material is increased.

The activation energy Ea is preferably 63 kJ/mol or more, more preferably 65 kJ/mol or more, and still more preferably 67 kJ/mol or more. The activation energy Ea is preferably 100 kJ/mol or less, more preferably 95 kJ/mol or less, and still more preferably 90 kJ/mol or less from a viewpoint of ease of returning to a trans form. By setting the activation energy Ea to such a value, the above effect can be obtained more easily.

In calculating the activation energy Ea of formula (1a), the structure in the transition state can be represented by general formula (3a), and the structure of the cis form can be represented by general formula (4a). General formulas (3a) and (4a) indicate the disposition (positions) of $B_1$ and $B_2$ with respect to the $Z_1=Z_2$ bond, and the positions of H, $r_2$—H, and O-$r_2$—H portions depend on the structure of the group A having an azomethine structure containing the structure of $B_1$.

Here, for calculating the molecular structure of the cis form of the above compound, the total energy of the cis form, the molecular structure of the compound in a transition state, and the total energy of the compound in the transition state, software of Gaussian 16 manufactured by U.S. Gaussian Inc. can be used, and density functional theory (B3LYP/6-31G(d)) can be used as a calculation method. As the molecular structure of the cis form, the most stable molecular structure of an isomer represented by general formula (4a), that is, a molecular structure having the lowest total energy is calculated, and this total energy is used as the total energy of the cis form. As the molecular structure in a transition state, a saddle point of a corresponding molecular structure is calculated for a transition state represented by general formula (3a), and the total energy obtained at this time is used as the total energy in the transition state. Note that the software and the calculation method are not particularly limited, and similar values can be obtained by using any software and any calculation method. From the calculated value obtained in this way, a value of the activation energy Ea can be obtained according to the above formula (1a).

By appropriately selecting the structures of $Z_1$, $Z_2$, $B_1$, and $B_2$ in the above general formula (1 a), the activation energy Ea represented by the above formula (1a) can be controlled to 60 kJ/mol or more.

Specifically, by introducing an electron-donating structure into the group A having an azomethine structure, the electron density of the azomethine moiety can be increased, and the activation energy Ea can be increased. For example, by using an aromatic heterocyclic group having a high electron donating property as at least one of $B_1$ and $B_2$, the activation energy Ea can be increased. In addition, by introducing a substituent having a high electron donating property into the aromatic hydrocarbon group or the aromatic heterocyclic group as $B_1$ or $B_2$, the activation energy Ea can be increased.

Here, preferable forms of the aromatic hydrocarbon group and the aromatic heterocyclic group, and examples of the substituent which can be introduced into the aromatic hydrocarbon group and the aromatic heterocyclic group are similar to those of the above-described azomethine derivative as the isomerized low molecular weight compound.

The structural unit represented by the above general formula (1a) has one polymerizable group with respect to the group having one azomethine moiety. As a result, a polymer that easily melts can be easily obtained even with a low amount of light irradiation energy.

The group having a polymerizable group of a monomer constituting the structural unit of general formula (1a)

preferably has a group represented by any of the above (i) to (iii). Polymers having these groups each having a polymerizable group correspond to polymers in which As in general formula (1a) are represented by general formulas (2a-a), (2a-b), and (2a-c), respectively.

The polymer represented by the above general formula (1a) is not particularly limited and can be prepared by any method. For example, by polymerizing a monomer represented by the following formula (i-2), (ii-2), or (iii-2), a polymer in which A in the above general formula (1a) is represented by the above general formula (2a-a), (2a-b), or (2a-c) can be obtained. In the following formulas (i-2), (ii-2), and (iii-2), $Z_1$, $Z_2$, $B_1$, and $B_2$ are similar to those in the above general formula (1a), and $r_1$ and $r_2$ are similar to those in the above general formula (1a) and the above formulas (i), (ii), and (iii). That is, in an embodiment of the present invention, the polymer contains a structural unit derived from an azomethine derivative having a polymerizable group represented by the following formula (i-2), (ii-2), or (iii-2).

[Chemical Formula 14-2]

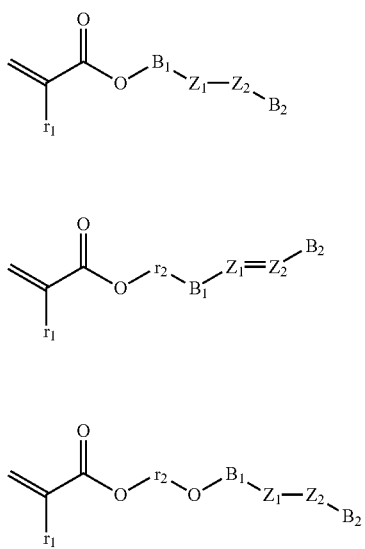

(i-2)

(ii-2)

(iii-2)

In a preferable embodiment, in the above general formula (1a), $B_1$ is a phenylene group bonded to an oxygen atom (in the case of (2a-a) or (2a-c)) or $r_2$ (in the case of (2a-b)) at a para position with respect to $Z_1$. That is, a preferable embodiment of the structural unit derived from an azomethine derivative contains a phenylene group having a linker moiety to a polymer main chain at a para position with respect to a carbon-nitrogen double bond. As a result, it is considered that the crystals easily collapse and fluidization by light irradiation more easily occurs.

At this time, it is preferable to use, as the isomerized polymer, a polymer containing a structural unit derived from an azomethine derivative containing a phenylene group having a linker moiety to a polymer main chain at a para position with respect to a carbon-nitrogen double bond, and to use, as the isomerized low molecular weight compound, an azobenzene derivative or an azomethine derivative having a phenyl group having an alkyl group having 1 to 18 carbon atoms or an alkoxy group having 1 to 18 carbon atoms at a para position with respect to a nitrogen-nitrogen double bond or a carbon-nitrogen double bond. By using these compounds, the effect that the crystals easily collapse and the photomeltability is improved can be obtained more remarkably. Therefore, fluidization by light irradiation can be performed more efficiently.

Another preferable embodiment of the present invention is a polymer in which $B_1$ is a phenylene group bonded to an oxygen atom (in the case of (2a-a) or (2a-c)) or $r_2$ (in the case of (2a-b)) at a para position with respect to $Z_1$, and $B_2$ is an aromatic heterocyclic group without a substituent or replaced with any of a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 19 carbon atoms, and an alkoxycarbonyl group having 2 to 19 carbon atoms in the above general formula (1a).

With the above configuration, the electron density of the azomethine moiety can be increased, and a fluidization/reversible non-fluidization phenomenon by light irradiation can be effectively induced. In addition, for example, a lattice defect that advantageously acts on cis-trans isomerization is formed, a free volume appears, and a π-π interaction is reduced. Therefore, it is considered that cis-trans isomerization more easily proceeds and fluidization more easily occurs.

Here, in the embodiment in which $B_1$ is a phenylene group and $B_2$ is an aromatic heterocyclic group, $Z_1$ is preferably N, and $Z_2$ is preferably CH. In the embodiment, the aromatic heterocyclic group of $B_2$ is preferably a thienyl group, a pyrrolyl group, a pyrazolyl group, a furanyl group, an imidazolyl group, or an indolyl group, with or without a substituent, and is particularly preferably a thienyl group, a furanyl group, a pyrazolyl group, or a pyrrolyl group, with or without a substituent.

Note that in the polymer, the structural unit represented by general formula (1a) may be used singly or in combination of two or more types thereof.

Specific examples of the structural units represented by general formula (1a) include structural units 1 to 4, 6, 7, and 18 illustrated in Table 2 below.

TABLE 2-1

| Structural unit No. | $r_1$ | A | Carbon number of $r_2$ | Position of substituent in $B_1$ | $Z_1$ | $Z_2$ | $R_{51}$ | $R_{52}$ | $R_{53}$ | $R_{54}$ | $R_{55}$ | X | $R_{62}$ | $R_{63}$ | $R_{64}$ |
|---|---|---|---|---|---|---|---|---|---|---|---|---|---|---|---|
| 1 | H | (iii) | 6 | $R_{53}$ | N | CH | H | H | — | H | H | S | $CH_3$ | H | H |
| 2 | H | (iii) | 6 | $R_{52}$ | N | CH | H | — | H | H | H | S | $CH_3$ | H | H |

TABLE 2-1-continued

| | | | Position of | | | | $B_1$ | | | | | | $B_2$ | | |
|---|---|---|---|---|---|---|---|---|---|---|---|---|---|---|---|
| Structural unit No. | $r_1$ | A | Carbon number of $r_2$ | substituent in $B_1$ | $Z_1$ | $Z_2$ | $R_{51}$ | $R_{52}$ | $R_{53}$ | $R_{54}$ | $R_{55}$ | X | $R_{62}$ | $R_{63}$ | $R_{64}$ |

(Structural unit contained in polymer)

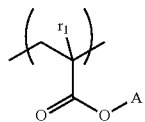

(Structure of group A having azomethine structure)

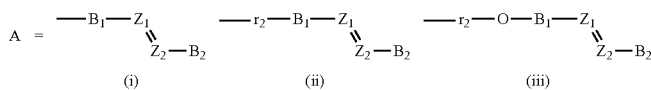

(Structure of $B_1$  $Z_1$=$Z_2$  $B_2$)

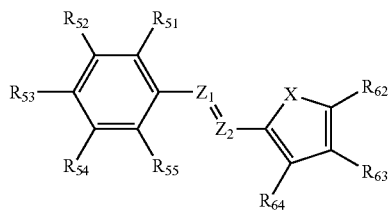

TABLE 2-2

(Structure of $B_1$—$Z_1$=$Z_2$—$B_2$)

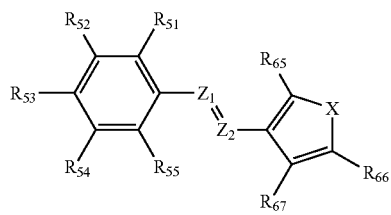

| Structural unit No. | $r_1$ | A | Carbon number of $r_2$ | Position of substituent in $B_1$ | $Z_1$ | $Z_2$ | $R_{51}$ | $R_{52}$ | $R_{53}$ | $R_{54}$ | $R_{55}$ | X | $R_{61}$ | $R_{65}$ | $R_{66}$ | $R_{67}$ |
|---|---|---|---|---|---|---|---|---|---|---|---|---|---|---|---|---|
| 3 | H | (iii) | 6 | $R_{53}$ | N | H | H | H | — | H | H | $NR_{61}$ | $C_6H_{13}$ | $CH_3$ | H | H |

TABLE 2-3

(Structure of $B_1$—$Z_1$=$Z_2$—$B_2$)

[Structure diagram: benzene ring with substituents $R_{51}$, $R_{52}$, $R_{53}$, $R_{54}$, $R_{55}$ connected via $Z_1$=$Z_2$ to another benzene ring with $R_{56}$, $R_{57}$, $R_{58}$, $R_{59}$, $R_{60}$]

| Structural unit No. | $r_1$ | A | Carbon number of $r_2$ | Position of substituent in $B_1$ | $Z_1$ | $Z_2$ | $R_{51}$ | $R_{52}$ | $R_{53}$ | $R_{54}$ | $R_{55}$ | $R_{56}$ | $R_{57}$ | $R_{58}$ | $R_{59}$ | $R_{60}$ |
|---|---|---|---|---|---|---|---|---|---|---|---|---|---|---|---|---|
| 4 | H | (i) | — | $R_{53}$ | N | CH | H | H | — | H | H | H | H | $N(C_2H_5)_2$ | H | H |
| 5 | H | (iii) | 10 | $R_{53}$ | N | N | H | H | — | H | H | H | H | $C_6H_{13}$ | H | H |

TABLE 2-4

(Structure of $B_1$—$Z_1$=$Z_2$—$B_2$)

[Structure diagram: benzene ring with $R_{51}$–$R_{55}$ connected via $Z_1$=$Z_2$ to a pyrazole ring with $R_{68}$, $R_{69}$, $R_{70}$]

| Structural unit No. | $r_1$ | A | Carbon number of $r_2$ | Position of substituent $B_1$ | $Z_1$ | $Z_2$ | $R_{51}$ | $R_{52}$ | $R_{53}$ | $R_{54}$ | $R_{55}$ | $R_{68}$ | $R_{69}$ | $R_{70}$ |
|---|---|---|---|---|---|---|---|---|---|---|---|---|---|---|
| 6 | H | (iii) | 6 | $R_{53}$ | N | CH | $CH_3$ | H | — | H | H | H | H | H |

TABLE 2-5

(Structure of $B_1$—$Z_1$=$Z_2$—$B_2$)

[Structure diagram: benzene ring with $R_{51}$–$R_{55}$ connected via $Z_1$=$Z_2$ to an imidazole ring with $R_{71}$, $R_{72}$, $R_{73}$]

| Structural unit No. | $r_1$ | A | Carbon number of $r_2$ | Position of substituent in $B_1$ | $Z_1$ | $Z_2$ | $R_{51}$ | $R_{52}$ | $R_{53}$ | $R_{54}$ | $R_{55}$ | $R_{71}$ | $R_{72}$ | $R_{73}$ |
|---|---|---|---|---|---|---|---|---|---|---|---|---|---|---|
| 7 | H | (iii) | 8 | $R_{53}$ | N | CH | H | H | — | H | H | H | H | H |

TABLE 2-6

(Structure of $B_1$—$Z_1$=$Z_2$—$B_2$)

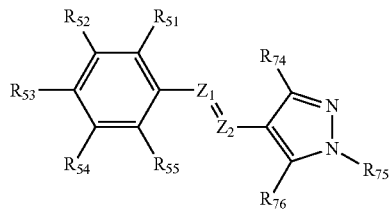

| Structural unit No. | $r_1$ | A | number of $r_2$ | Position of substituent in $B_1$ | $Z_1$ | $Z_2$ | B $R_{51}$ | $R_{52}$ | $R_{53}$ | $R_{54}$ | $R_{55}$ | B $R_{74}$ | $R_{75}$ | $R_{76}$ |
|---|---|---|---|---|---|---|---|---|---|---|---|---|---|---|
| 18 | H | (iii) | 10 | $R_{53}$ | N | CH | H | H | — | H | H | H | $CH_3$ | H |

<Method for Preparing Azobenzene Derivative Having Polymerizable Group or Azomethine Derivative Having Polymerizable Group>

A method for preparing an azobenzene derivative having a polymerizable group or an azomethine derivative having a polymerizable group is not particularly limited. For example, the azobenzene derivative having a polymerizable group or the azomethine derivative having a polymerizable group can be prepared by first preparing a desired azobenzene derivative or azomethine derivative, and then introducing a group having a polymerizable group into the obtained azobenzene derivative or azomethine derivative. Hereinafter, an example of the method for preparing an azomethine derivative having a polymerizable group will be described. Note that the azobenzene derivative having a polymerizable group can also be appropriately prepared with reference to the following scheme.

For example, when an azomethine derivative containing a thiophene ring is prepared, as a first stage, an aniline derivative is reacted with a thiophene carboxylaldehyde derivative as a compound having a thiophene ring. At this time, when either the aniline derivative or the thiophene carboxyaldehyde derivative as a raw material has an OH group as a substituent, a polymerizable group can be easily introduced into the position of the OH group.

For example, in a case of an azomethine derivative in which $Z_1$ is N, $Z_2$ is CH, X is S, $B_1$ is a phenylene group having a polymerizable group at a para position with respect to $Z_1$, and $B_2$ is a 2-methylthienyl group bonded to $Z_2$ at a 5-position in the above general formula (1a), intermediate A can be obtained according to the following reaction formula.

Specifically, 4-hydroxyaniline and 5-methylthiophen-2-carboxyaldehyde are treated in a solvent such as ethanol (EtOH) or methanol (MeOH) (heated and refluxed to cause a reaction), and the reaction solution is filtered. The obtained powder is washed with cooling ethanol and recrystallized with methanol/ethanol to obtain the target product.

[Chemical formula 15]

Intermediate A

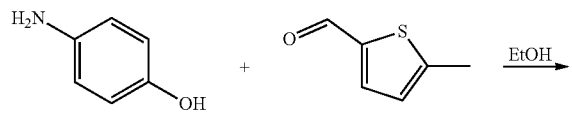

-continued (Intermediate A)

Thereafter, as a second stage, a polymerizable group is introduced into the above intermediate A. A method for introducing a polymerizable group is not particularly limited. For example, when a linker moiety —$C_6H_{12}$— is introduced into the above intermediate A, for example, Cl—$C_6H_{12}$—OH is allowed to act as a halogenated alcohol compound to obtain the following intermediate B.

Reaction conditions are not particularly limited, but the reaction is caused preferably within a range of 0° C. or higher and 100° C. or lower, more preferably within a range of 0° C. or higher and 60° C. or lower, still more preferably within a range of 0° C. or higher and 40° C. or lower in the presence of potassium carbonate and potassium iodide in a solvent such as dimethylformamide (DMF).

[Chemical formula 16]

Intermediate B

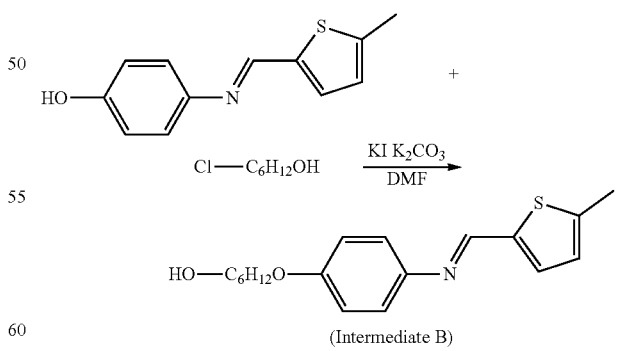

(Intermediate B)

Thereafter, as a third stage, intermediate B is reacted with a compound for constituting a group having a polymerizable group, for example, an acrylic acid chloride or a methacrylic acid chloride. Reaction conditions are not particularly limited. For example, the reaction is preferably caused in a known organic solvent in the presence of a tertiary amine such as triethylamine or triethanolamine. Preferably, a compound for constituting a group having a polymerizable group, such as an acrylic acid chloride or a methacrylic acid chloride, is dropwise added to and mixed with a mixed solution containing the above intermediate B, a tertiary amine, and a solvent while the temperature of the mixed solution is kept at 0 to 10° C. Thereafter, the mixed solution is reacted at room temperature for about 5 to 10 hours to obtain an azomethine derivative having a polymerizable group.

[Chemical formula 17]

Azobenzene derivative having polymerizable group

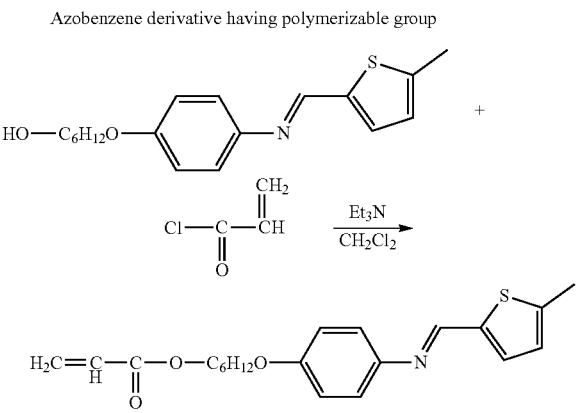

Note that in the above first stage, by changing the raw material used to another compound, an azomethine derivative having a desired substituent can be obtained. For example, by reacting a benzaldehyde derivative with an aminothiophene derivative, an azomethine derivative in which $Z_1$ is CH, $Z_2$ is N, B, is a phenylene group, and $B_2$ is a thienyl group in general formula (1a) can be obtained. By using another aromatic hydrocarbon compound or aromatic heterocyclic compound (carboxyaldehyde derivative) instead of the compound having a thiophene ring (thiophene carboxylaldehyde derivative) as a raw material, an azomethine derivative having a different structure of $B_2$ can be obtained. Similarly, by changing the aniline derivative as a raw material to another aromatic hydrocarbon compound or aromatic heterocyclic compound having an amino group, an azomethine derivative having a different structure of $B_1$ can be obtained.

By changing the compounds to be added in the second stage and the third stage, a group having a polymerizable group having a different structure can be introduced. A person skilled in the art can synthesize an azomethine derivative having a desired polymerizable group by appropriately making the above changes and selecting appropriate reaction conditions.

By appropriately selecting a raw material to be used in the above first stage, a group having a polymerizable group can be introduced into intermediate A without performing the second stage.

<Structural Unit Other than Structural Unit Containing Isomerized Structure>

The polymer used in the present invention may contain a structural unit (another structural unit) other than the structural unit containing an isomerized structure. In a case of a copolymer containing another structural unit, an arrangement form of repeating units of the copolymer is not particularly limited, and the copolymer may be any of a random copolymer, a block copolymer, and an alternating copolymer.

The other structural unit is not particularly limited as long as the other structural unit does not contain an isomerized structure, but is preferably a structural unit constituting a thermoplastic resin that is softened by heating.

The other structural unit preferably has a vinyl-based polymerizable group because a copolymer is easily synthesized. Specific examples thereof include a styrene derivative, a (meth)acrylic acid derivative, an olefin derivative, a vinyl ester derivative, a vinyl ether derivative, and a vinyl ketone derivative, and a structural unit derived from a styrene derivative, a (meth)acrylic acid derivative, or an olefin derivative is preferable.

Examples of the styrene derivative include styrene, o-methylstyrene, m-methylstyrene, p-methylstyrene, α-methylstyrene, p-phenylstyrene, p-ethylstyrene, 2,4-dimethylstyrene, p-t-butylstyrene, p-n-hexylstyrene, p-n-octylstyrene, p-n-nonylstyrene, p-n-decylstyrene, and p-n-dodecylstyrene.

Examples of the (meth)acrylic acid derivative include (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, n-hexyl (meth)acrylate, n-octyl (meth)acrylate, 2-ethylhexyl (meth)acrylate, stearyl (meth)acrylate, dodecyl (meth)acrylate, phenyl (meth)acrylate, diethylaminoethyl (meth)acrylate, and dimethylaminoethyl (meth) acrylate.

Examples of the olefin derivative include ethylene, propylene, n-butylene, isobutylene, n-pentene, and 3-methyl-1-pentene. The olefin derivative may be linear or branched, and the number of carbon atoms in the chain is not particularly limited.

Examples of the vinyl ester derivative include vinyl propionate, vinyl acetate, and vinyl benzoate. Examples of the vinyl ether derivative include vinyl methyl ether and vinyl ethyl ether. Examples of the vinyl ketone derivative include vinyl methyl ketone, vinyl ethyl ketone, and vinyl hexyl ketone.

The content of the other structural unit in the polymer is not particularly limited and can be appropriately selected, but is preferably 70% by mass or less, and more preferably 40% by mass or less with respect to 100% by mass of the total amount of all structural units constituting the polymer.

The number average molecular weight Mn of the polymer is not particularly limited, but is preferably 1000 or more, more preferably 3500 or more, still more preferably 3500 to 100000, further preferably 3500 to 70000, further still more preferably 3500 to 50000, and particularly preferably 5000 to 50000. When the number average molecular weight of the polymer is 3500 or more, a toner image having excellent toughness and excellent fixability when the polymer is used as a toner can be more easily obtained, which is preferable. When the number average molecular weight is 100000 or less, the efficiency of isomerization and softening and melting is high, which is preferable.

The number average molecular weight of the polymer can be measured by gel permeation chromatography (GPC). Specifically, the number average molecular weight can be measured by a method described in Examples described later.

<Method for Preparing Polymer>

A method for synthesizing the polymer is not particularly limited, and a method for polymerizing a monomer such as an azomethine derivative or an azobenzene derivative having the above-described polymerizable group using a known polymerization initiator, such as anionic polymerization, cationic polymerization, or living radical polymerization, can be used. A known chain transfer agent may be used as necessary.

Examples of the polymerization initiator include the following azo-based or diazo-based polymerization initiator and peroxide-based polymerization initiator.

Examples of the azo-based or diazo-based polymerization initiator include 2,2'-azobis-(2,4-dimethylvaleronitrile), 2,2'-azobisisobutyronitrile, 1,1'-azobis(cyclohexane-1-carbonitrile), and 2,2'-azobis-4-methoxy-2,4-dimethylvaleronitrile.

Examples of the peroxide-based polymerization initiator include benzoyl peroxide, methyl ethyl ketone peroxide, diisopropyl peroxycarbonate, cumene hydroperoxide, t-butyl hydroperoxide, di-t-butyl peroxide, dicumyl peroxide, 2,4-dichlorobenzoyl peroxide, lauroyl peroxide, 2,2-bis-(4,4-t-butylperoxycyclohexyl) propane, and tris-(t-butylperoxy) triazine.

Examples of the chain transfer agent include benzyl dithiobenzoate, 1-phenylethyl dithiobenzoate, 2-phenylprop-2-yl dithiobenzoate, 1-acetoxylethyl dithiobenzoate, hexakis(thiobenzoylthiomethyl) benzene, 1,4-bis(thiobenzoylthiomethyl) benzene, 1,2,4,5-tetrakis(thiobenzoylthiomethyl) benzene, 1,4-bis-(2-(thiobenzoylthio) prop-2-yl) benzene, 1-(4-methoxyphenyl) ethyl dithiobenzoate, benzyl dithioacetate, ethoxycarbonylmethyl dithioacetate, 2-(ethoxycarbonyl) prop-2-yl dithiobenzoate, 2-cyanoprop-2-yl dithiobenzoate, t-butyl dithiobenzoate, 2,4,4-trimethyl-pent-2-yl dithiobenzoate, 2-(4-chlorophenyl) prop-2-yl dithiobenzoate, 3- and 4-vinyl benzyl dithiobenzoate, S-benzyldiethoxyphosphinyl dithioformate, t-butyltrithioperbenzoate, 2-phenylprop-2-yl 4-chloro dithiobenzoate, 2-phenylprop-2-yl 1-dithionaphthalate, 4-cyanopentanoic acid dithiobenzoate, dibenzyltetrathioterephthalate, dibenzyltrithiocarbonate, and carboxymethyl dithiobenzoate.

The polymerization temperature varies depending on the types of monomer and polymerization initiator used, but is preferably 50 to 100° C., and more preferably 55 to 90° C. The polymerization time varies depending on the types of monomer and polymerization initiator used, but is preferably 2 to 60 hours, for example.

Note that a method for preparing a copolymer containing a structural unit (another structural unit) other than the structural unit containing an isomerized structure is not particularly limited.

For example, when a random copolymer is prepared, as a raw material monomer, in addition to a monomer for constituting a structural unit containing an isomerized structure, a monomer for constituting the above other structural unit is mixed with a chain transfer agent, a polymerization initiator, and the like, and a polymerization reaction is performed to obtain the desired copolymer. A specific form of the monomer for constituting the other structural unit is as described above.

A preferable embodiment of the polymer used in the composition according to an embodiment of the present invention is a polymer (block copolymer) represented by the following general formula (5).

[Chemical formula 18]

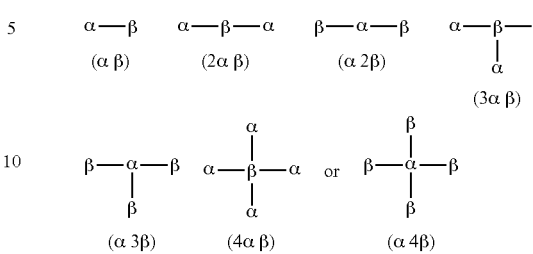

General formula (5)

In the above general formula (5), α is a polymer block containing a structural unit containing an isomerized structure, and β is a polymer block not containing a structural unit containing an isomerized structure.

Thermal energy emitted in a photoexcitation/deactivation process of the isomerized structure is transmitted to repeating units (structural units) bonded by polymerization, and melting or softening can proceed in the polymer. In addition, it is considered that by forming a block copolymer, the portion of the isomerized structure easily forms a domain in the polymer, and softening/melting is efficiently induced. Therefore, the effect of the present invention can be obtained still more remarkably.

Among the above block copolymer structures, an α-β-α (also referred to as 2α-β) or β-α-β (also referred to as 2β-α) block copolymer structure is preferable, and an α-β-α block copolymer structure is more preferable from a viewpoint of ease of softening and melting and image intensity when the block copolymer is used as a toner.

A specific form of the structural unit containing an isomerized structure constituting the polymer block α is as described above.

The structural unit constituting the polymer block β does not contain an isomerized structure. Specifically, the form described as another structural unit can be preferably used. In particular, the structural unit preferably has a vinyl-based polymerizable group fi-om a viewpoint of application to synthesis of a block copolymer by a living radical polymerization method such as an ATRP method, an ARGET-ATRP method, or a RAFT method. Specific examples thereof include a styrene derivative, a (meth)acrylic acid derivative, an olefin derivative, a vinyl ester derivative, a vinyl ether derivative, and a vinyl ketone derivative, and a styrene derivative, a (meth)acrylic acid derivative, or an olefin derivative is preferable. Note that specific forms thereof are similar to those described above.

The number average molecular weight (sum of number average molecular weights) of the polymer blocks α contained in the polymer represented by general formula (5) is not particularly limited, but is preferably 1000 or more, more preferably 1000 to 100000, still more preferably 1000 to 70000, further still more preferably 1000 to 50000, and particularly preferably 3000 to 50000. When the sum of number average molecular weights of the polymer blocks α is 1000 or more, a toner image having excellent fixability when the polymer is used as a toner can be more easily obtained, which is preferable. When the sum of number average molecular weights of the polymer blocks α is 100000 or less, the efficiency of softening and melting is high, which is preferable. Here, the sum of number average molecular weights of the polymer blocks α refers to the number average molecular weight of a single polymer block β when the polymer represented by general formula (5) contains the single polymer block α, and refers to the sum of the number average molecular weights of a plurality of polymer blocks α when the polymer represented by general formula (5) contains the plurality of polymer blocks α.

The number average molecular weight (sum of number average molecular weights) of the polymer blocks β contained in the polymer represented by the general formula (5) is not particularly limited, but is preferably 1000 or more, more preferably 1000 to 100000, still more preferably 1000 to 70000, further still more preferably 1000 to 50000, and particularly preferably 3000 to 50000. When the sum of number average molecular weights of the polymer blocks β is 1000 or more, a toner image having excellent fixability when the polymer is used as a toner can be more easily obtained, which is preferable. When the sum of number average molecular weights of the polymer blocks β is 100000 or less, the efficiency of softening and melting is high, which is preferable. Here, the sum of number average molecular weights of the polymer blocks α refers to the number average molecular weight of a single polymer block 3 when the polymer represented by general formula (5) contains the single polymer block f, and refers to the sum of the number average molecular weights of a plurality of polymer blocks β when the polymer represented by general formula (5) contains the plurality of polymer blocks β.

The total number average molecular weight Mn of the polymer represented by general formula (5) is preferably 3500 or more, more preferably 3500 to 100000, still more preferably 3500 to 70000, further still more preferably 3500 to 50000, and particularly preferably 5000 to 50000. When the total number average molecular weight of the polymer represented by general formula (5) is 3500 or more, a toner image having excellent fixability when the polymer is used as a toner can be more easily obtained, which is preferable. When the total number average molecular weight is 100000 or less, the efficiency of softening and melting is high, which is preferable.

Therefore, according to a preferable embodiment of the present invention, the sum of number average molecular weights of the polymer blocks α contained in the polymer represented by general formula (5) is 1000 or more, the sum of number average molecular weights of the polymer blocks β is 1000 or more, and the total number average molecular weight Mn of the polymer represented by the above general formula (5) is 3500 or more.

In the polymer represented by general formula (5), a ratio between the sum of number average molecular weights of the polymer blocks α and the sum of number average molecular weights of the polymer blocks 3 is not particularly limited, but the sum of number average molecular weights of the polymer blocks α: the sum of number average molecular weights of the polymer blocks β is preferably 1:20 to 20:1, and more preferably 1:15 to 15:1 from a viewpoint of ease of softening and melting and image intensity.

The total number average molecular weight of the polymer represented by general formula (5), the sum of number average molecular weights of the polymer blocks α, and the sum of number average molecular weights of the polymer blocks β can be measured by gel permeation chromatography (GPC). Specifically, the number average molecular weight can be measured by a method described in Examples described later.

A method for synthesizing the block copolymer represented by general formula (5) is not particularly limited, and a known method such as anionic polymerization, cationic polymerization, or living radical polymerization can be used. Above all, a living radical polymerization method such as an atom transfer radical polymerization method (ATRP method), an ARGET-ATRP method, or a RAFT method can be suitably used as a simple synthesis method.

For example, in the case of the ATRP method, the synthesis can be performed by using a compound containing a monofunctional, bifunctional, trifunctional, or tetrafunctional halogen element as a starting material, and polymerizing a monomer as a structural unit of the polymer block α or β in the presence of a catalyst.

In the stage of polymerizing a monomer, for example, a monomer that is a structural unit of either the polymer block α or the polymer block β (block that is a core portion of the block copolymer) is polymerized in the presence of an initiator, a catalyst, and a ligand to manufacture a macroinitiator.

Examples of the initiator include butyl 2-bromoisobutyrate, ethyl 2-bromoisobutyrate, ethylenebis(2-bromoisobutyrate), 1,1,1-tris(2-bromoisobutyryloxymethyl) ethane, pentaerythritol tetrakis(2-bromoisobutyrate), α,α'-dibromo-p-xylene, ethyl bromoacetate, 2-bromoisobutyryl bromide, and a mixture thereof, but are not limited thereto.

Examples of the catalyst include a copper(I) catalyst and an iron(II) catalyst, and examples thereof include Cu(I)CI, Cu(I)Br, Fe(II)CI, Fe(II)Br, and a mixture thereof.

A known ligand can be used, but one or more selected from the group consisting of 2,2'-bipyridyl, 4,4'-dimethyl-2,2'-bipyridyl, 4,4'-di-tert-butyl-2, 2'-bipyridyl, 1,1,4,7,10, 10-hexamethyltriethylenetetramine, N,N,N',N'',N''-pentamethyldiethylenetriamine, cyclam (1,4,8,11-tetraazacyclotetradecane), 1,4,8,11-tetramethyl cyclam (1,4, 8,11-tetramethyl-1,4,8,11-tetraazacyclotetradecane), tris[2-(dimethyl) amino) ethyl] amine, and the like is preferable.

The amounts of the catalyst and the ligand used are not particularly limited and can be appropriately determined with reference to conventionally known findings.

Next, by isolating the macroinitiator obtained by the above polymerization and using the macroinitiator as an initiator, a monomer that is not used in the synthesis of the macroinitiator out of the monomers that are structural units of the polymer blocks α and β is polymerized again in the presence of a catalyst and a ligand. Alternatively, at a stage where almost all the monomers are consumed in the synthesis of the macroinitiator, the monomer not used in the synthesis of the macroinitiator may be added as it is without isolating the macroinitiator, and the polymerization may be continued. Through these operations, the desired block copolymer can be obtained.

Each of the above reactions is preferably performed in an inert atmosphere such as nitrogen or a rare gas including argon. Each of the above reactions can be performed, for example, at a temperature of 25 to 160° C., preferably at a temperature of 35 to 130° C. Each of the above reactions may be performed without using a solvent, or may be performed in a solvent such as an organic solvent.

Note that the types and amounts of a catalyst and a ligand used, and conditions such as the temperature at the time of the reaction in the reaction of polymerizing a monomer that is a structural unit of either one of the polymer blocks α and β to obtain a macroinitiator may be the same as or different from those in the reaction of reacting the macroinitiator with a monomer that is a structural unit of the other polymer block to obtain a block copolymer.

[Mixing Ratio Between Isomerized Polymer and Isomerized Low Molecular Weight Compound]

In the composition according to an embodiment of the present invention, a mixing ratio between the isomerized polymer and the isomerized low molecular weight compound is not particularly limited, but is preferably within a range of isomerized polymer: isomerized low molecular weight compound=99:1 to 10:90 in terms of mass ratio. When the content of the isomerized polymer is 99% by mass or less with respect to the total amount of 100% by mass of the isomerized polymer and the isomerized low molecular weight compound, the effect of suppressing the light irradiation amount required for fluidization is excellent. When the content of the isomerized polymer is 10% by mass or more, a composition having excellent adhesiveness can be obtained more easily. Above all, isomerized polymer: isomerized low molecular weight compound=30:70 to 90:10 is more preferable, and isomerized polymer: isomerized low molecular weight compound=40:60 to 80:20 is still more preferable.

Note that the composition according to an embodiment of the present invention may contain a component other than the isomerized polymer and the isomerized low molecular weight compound. Specific forms and contents of the component other than the isomerized polymer and the isomerized low molecular weight compound are not particularly limited as long as the composition is fluidized from a solid state by light irradiation and reversibly non-fluidized.

In an embodiment, the total amount of the isomerized polymer and the isomerized low molecular weight compound is preferably 90% by mass or more, more preferably 95% by mass or more, ad still more preferably 98% by mass or more in the total composition. The composition according to the present embodiment can be used, as an adhesive, as it is or by containing an appropriate amount of any known additive. Similarly, the composition according to the present embodiment can be used, as an optical switching material, as it is or by containing an appropriate amount of any known additive. As will be described later, a toner can be prepared by using the composition according to the present embodiment and further using a binder resin, a colorant, or the like, as necessary.

[Combination of Isomerized Polymer and Isomerized Low Molecular Weight Compound]

As the isomerized polymer and the isomerized low molecular weight compound that can be used in the composition according to an embodiment of the present invention, a polymer and a compound that are fluidized by light irradiation and reversibly non-fluidized can be appropriately combined and used. However, in particular, when the isomerized polymer and the isomerized low molecular weight compound are used for a toner, a polymer containing a structural unit derived from an azomethine derivative and an azomethine compound are preferably used in combination.

Above all, a polymer containing a structural unit derived from an azomethine derivative containing a phenylene group having a linker moiety to a polymer main chain at a para position with respect to a carbon-nitrogen double bond, and an azomethine compound having a phenyl group having an alkyl group having 1 to 18 carbon atoms or an alkoxy group having 1 to 18 carbon atoms at a para position with respect to a nitrogen-carbon double bond are preferably used in combination. As a result, fluidization by light irradiation can proceed more efficiently.

The structural unit derived from the azomethine derivative in the polymer and the azomethine compound preferably each contain a thiophene ring or a pyrrole ring. As a result, fluidization by light irradiation can proceed more efficiently.

[Method for Preparing Composition]

A method for preparing the composition according to an embodiment of the present invention is not particularly limited. Examples thereof include a method for preparing an isomerized polymer and an isomerized low molecular weight compound, dissolving the isomerized polymer and the isomerized low molecular weight compound in a solvent that can dissolve the isomerized polymer and the isomerized low molecular weight compound at a desired mixing ratio, then removing the solvent, and drying the residue.

<Fluidization by Light Irradiation and Reversible Non-Fluidization>

The wavelength of irradiation light when the composition according to an embodiment of the present invention is fluidized by light irradiation is preferably within a range of 280 nm or more and 480 nm or less, more preferably within a range of 300 nm or more and 420 nm or less, and still more preferably within a range of 330 nm or more and 420 nm or less. Within the above range, the crystals easily collapse (photomeltability is improved.), and the fixability is enhanced. For fluidization, in addition to light irradiation, heat or pressure may be applied to promote fluidization. By irradiation with irradiation light having the above wavelength, even when heat or pressure is applied, the composition can be fluidized with less heat or pressure. Therefore, by introducing the composition according to an embodiment of the present invention into a toner, a toner that can be fixed at the above wavelength, has excellent fixability, and has high color reproducibility can be obtained.

Note that the above wavelength range includes the wavelength of a part of visible light. Therefore, desirably, the composition according to an embodiment of the present invention is not fluidized only by receiving sunlight (natural light) or light from a lighting such as a fluorescent lamp, and is fluidized under low cost conditions in which the irradiation amount and irradiation time are suppressed as much as possible. As irradiation condition of irradiation light when the composition is fluidized, the irradiation amount is, for example, within a range of 0.1 $J/cm^2$ or more and 200 $J/cm^2$ or less, preferably 0.1 $J/cm^2$ or more and 100 $J/cm^2$ or less, more preferably within a range of 0.1 $J/cm^2$ or more and 50 $J/cm^2$ or less, and still more preferably within a range of 0.1 $J/cm^2$ or more and 30 $J/cm^2$ or less from this viewpoint.

When the composition is fluidized, the composition may be heated under light irradiation. As a result, the composition can be fluidized with a lower irradiation amount. The heating temperature at this time is, for example, within a range of 20° C. or higher and 200° C. or lower, and preferably within a range of 20° C. or higher and 150° C. or lower.

Meanwhile, as the conditions for non-fluidizing (resolidifying) the composition according to an embodiment of the present invention, the composition is preferably left at room temperature (range of 25±15° C.) (in a natural environment), heated, or irradiated with visible light. The wavelength and irradiation conditions of visible light when the composition according to an embodiment of the present invention is non-fluidized by visible light irradiation are not particularly limited, but light having a longer wavelength than the wavelength of the irradiation light when the composition according to an embodiment of the present invention is fluidized is preferable.

When the composition is heated to be non-fluidized, the heating temperature is preferably within a range of 0° C. or higher and 200° C. or lower, more preferably within a range of 20° C. or higher and 150° C. or lower, and still more preferably within a range of 20° C. or higher and 100° C. or lower.

[Composition of Toner]

An embodiment of the present invention is a toner containing the composition according to an embodiment of the present invention. By introducing the composition according to an embodiment of the present invention into a toner, a toner that can be fixed by light irradiation with less energy and has excellent fixability can be obtained. Note that the toner refers to a toner matrix particle or an aggregate of toner particles. The toner particle is preferably a particle obtained by adding an external additive to a toner matrix particle, but the toner matrix particle can also be used as it is as the toner particle. Note that in the present invention, when it is not necessary to distinguish among the toner matrix particle, the toner particle, and the toner, these are also simply referred to as "toner".

The content of the composition in the toner depends on the types of the isomerized polymer and the isomerized low molecular weight compound, but the total amount of the isomerized polymer and the isomerized low molecular weight compound is preferably within a range of 5 to 95% by mass with respect to the total amount of a binder resin, a colorant, a release agent, the isomerized polymer, and the isomerized low molecular weight compound constituting the toner from a viewpoint of efficient fluidization and image intensity.

Note that when the composition according to an embodiment of the present invention is used as the toner, the isomerized polymer is preferably a polymer containing a structural unit derived from an azomethine derivative, and the isomerized low molecular weight compound is preferably an azomethine derivative. Since the azomethine derivative is not significantly colored, a toner having high color reproducibility of a colorant can be obtained.

<Binder Resin>

The toner according to an embodiment of the present invention may further contain a binder resin. As the binder resin, a resin not containing a structure derived from an isomerized structure or a structure derived from an isomerized low molecular weight compound, and generally used as a binder resin constituting a toner can be used without limitation. Examples of the binder resin include a styrene resin, an acrylic resin, a styrene acrylic resin, a polyester resin, a silicone resin, an olefin resin, an amide resin, and an epoxy resin. These binder resins can be used singly or in combination of two or more types thereof.

Above all, the binder resin preferably contains at least one selected from the group consisting of a styrene resin, an acrylic resin, a styrene acrylic resin, and a polyester resin, and more preferably contains at least one selected from the group consisting of a styrene acrylic resin and a polyester resin from a viewpoint of reducing viscosity when being melted and having high sharpness meltability.

(Styrene Acrylic Resin)

The styrene acrylic resin referred to in the present invention is a polymer containing at least a structural unit derived from a styrene monomer and a structural unit derived from a (meth)acrylate monomer. Here, the styrene monomer includes, in addition to styrene represented by a structural formula of $CH_2=CH-C_6H_5$, a monomer having a known side chain or functional group in a styrene structure.

Examples of the styrene monomer include those similar to a styrene monomer that can constitute the above-described polymer.

The (meth)acrylate monomer has a functional group having an ester bond in a side chain. Specific examples thereof include, in addition to an acrylate monomer represented by $CH_2=CHCOOR$ (R is an alkyl group), a vinyl-based ester compound such as a methacrylate monomer represented by $CH_2=C(CH_3)COOR$ (R is an alkyl group). Note that the (meth)acrylate in the (meth)acrylate monomer means an acrylate and a methacrylate.

Examples of the (meth)acrylate monomer include methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, n-octyl (meth)acrylate, 2-ethylhexyl (meth)acrylate, stearyl (meth)acrylate, dodecyl (meth)acrylate, phenyl (meth)acrylate, diethylaminoethyl (meth)acrylate, and dimethylaminoethyl (meth)acrylate.

The styrene monomers can be used singly or in combination of two or more types thereof, and the (meth)acrylate monomers can be used singly or in combination of two or more types thereof.

The contents of a structural unit derived from the styrene monomer and a structural unit derived from the (meth)acrylate monomer in the styrene acrylic resin are not particularly limited, and can be adjusted appropriately from a viewpoint of controlling the softening point and the glass transition temperature of the binder resin. Specifically, the content of a structural unit derived from the styrene monomer is preferably 40 to 95% by mass, and more preferably 50 to 90% by mass with respect to all the structural units constituting the styrene acrylic resin. The content of a structural unit derived from the (meth)acrylate monomer is preferably 5 to 60% by mass, and more preferably 10 to 50% by mass with respect to all the structural units constituting the styrene acrylic resin.

The styrene acrylic resin may further contain a structural unit derived from a monomer other than the styrene monomer and the (meth)acrylate monomer as necessary. Examples of the other monomer include a vinyl monomer. Hereinafter, a vinyl monomer that can be used in combination when the styrene-acrylic copolymer referred to in the present invention is formed will be illustrated, but the vinyl monomer that can be used in combination is not limited to those illustrated below.

(1) Olefin

Ethylene, propylene, isobutylene, and the like (2) Vinyl ester

Vinyl propionate, vinyl acetate, vinyl benzoate, and the like (3) Vinyl ether

Vinyl methyl ether, vinyl ethyl ether, and the like (4) Vinyl ketone

Vinyl methyl ketone, vinyl ethyl ketone, vinyl hexyl ketone, and the like (5) N-vinyl compound N-vinylcarbazole, N-vinyl indole, N-vinyl pyrrolidone, and the like.

(6) Others

A vinyl compound such as vinyl naphthalene or vinyl pyridine; and an acrylic acid derivative or a methacrylic acid derivative such as acrylonitrile, methacrylonitrile, or acrylamide.

A resin having a crosslinked structure can also be prepared using a polyfunctional vinyl monomer. Furthermore, a vinyl monomer having an ionic dissociating group in a side chain can also be used. Specific examples of the ionic dissociating group include a carboxyl group, a sulfonic acid group, and a phosphoric acid group. Specific examples of vinyl monomers having these ionic dissociating groups are illustrated below.

Specific examples of the vinyl monomer having a carboxyl group include acrylic acid, methacrylic acid, maleic acid, itaconic acid, cinnamic acid, fumaric acid, a maleic acid monoalkyl ester, and an itaconic acid monoalkyl ester.

A method for preparing the styrene acrylic resin is not particularly limited, and examples thereof include a method for polymerizing a monomer using a known oil-soluble or water-soluble polymerization initiator. A known chain transfer agent such as n-octyl mercaptan or n-octyl-3-mercaptopropionate may be used as necessary. As the oil-soluble polymerization initiator, for example, an azo-based or diazo-based polymerization initiator or a peroxide-based polymerization initiator is used. Specific forms of the azo-based or diazo-based polymerization initiator and the peroxide-based polymerization initiator are similar to those described in the above method for preparing a polymer.

When styrene acrylic resin particles are formed by an emulsion polymerization method, a water-soluble radical polymerization initiator can be used. Example of the water-soluble radical polymerization initiator include a persulfate such as potassium persulfate or ammonium persulfate, azobisaminodipropane acetate, azobiscyanovaleric acid and a salt thereof, and hydrogen peroxide.

The polymerization temperature varies depending on the types of monomer and polymerization initiator used, but is preferably 50 to 100° C., and more preferably 55 to 90° C. The polymerization time varies depending on the types of monomer and polymerization initiator used, but is preferably 2 to 12 hours, for example.

The styrene acrylic resin particles formed by the emulsion polymerization method may have two or more layers made of resins having different compositions. As a manufacturing method in this case, a multi-stage polymerization method for adding a polymerization initiator and a polymerizable monomer to a dispersion of resin particles prepared by an emulsion polymerization process (first stage polymerization) according to a conventional method, and subjecting this system to a polymerization process (second stage and third stage polymerization) can be adopted.

(Polyester Resin)

The polyester resin is a polyester resin obtained by a polycondensation reaction between a di- or higher valent carboxylic acid (polyvalent carboxylic acid component) and a di- or higher hydric alcohol (polyhydric alcohol component). Note that the polyester resin may be amorphous or crystalline.

The valence of each of the polyvalent carboxylic acid component and the polyhydric alcohol component is preferably 2 or 3, and more preferably 2. That is, the polyvalent carboxylic acid component preferably contains a dicarboxylic acid component, and the polyhydric alcohol component preferably contains a dialcohol component.

Examples of the dicarboxylic acid component include: a saturated aliphatic dicarboxylic acid such as oxalic acid, malonic acid, succinic acid, glutaric acid, adipic acid, pimelic acid, suberic acid, azelaic acid, sebacic acid, 1,9-nonanedicarboxylic acid, 1,10-decanedicarboxylic acid (dodecanedioic acid), 1,11-undecanedicarboxylic acid, 1,12-dodecanedicarboxylic acid, 1,1 3-tridecanedicarboxylic acid, 1,14-tetradecanedicarboxylic acid, 1,16-hexadecanedicarboxylic acid, or 1,18-octadecanedicarboxylic acid; an unsaturated aliphatic dicarboxylic acid such as methylene succinic acid, fumaric acid, maleic acid, 3-hexendiodic acid, 3-octenedioic acid, or dodecenyl succinic acid; an unsaturated aromatic dicarboxylic acid such as phthalic acid, terephthalic acid, isophthalic acid, t-butyl isophthalic acid, tetrachlorophthalic acid, chlorophthalic acid, nitrophthalic acid, p-phenylenediacetic acid, 2,6-naphthalene dicarboxylic acid, 4,4'-biphenyldicarboxylic acid, or anthracenedicarboxylic acid; lower alkyl esters thereof; and acid anhydrides thereof. The dicarboxylic acid components may be used singly or in mixture of two or more types thereof.

In addition, for example, a tri- or higher valent polyvalent carboxylic acid such as trimellitic acid or pyromellitic acid, an anhydride thereof, and an alkyl ester thereof having 1 to 3 carbon atoms can be used.

Examples of the diol component include: a saturated aliphatic diol such as ethylene glycol, 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, 1,20-eicosandiol, or neopentyl glycol; an unsaturated aliphatic diol such as 2-butene-1,4-diol, 3-butene-1,4-diol, 2-butyne-1,4-diol, 3-butyne-1,4-diol, or 9-octadecene-7,12-diol; and an aromatic diol such as a bisphenol including bisphenol A and bisphenol F, or an alkylene oxide adduct of a bisphenol including an ethylene oxide adduct thereof and a propylene oxide adduct thereof. Derivatives thereof can also be used. The diol components may be used singly or in mixture of two or more types thereof.

A method for manufacturing the polyester resin is not particularly limited, and the polyester resin can be manufactured by polycondensing (esterifying) the polyvalent carboxylic acid component and the polyhydric alcohol component using a known esterification catalyst.

Examples of a catalyst that can be used for manufacturing the polyester resin include: an alkali metal compound of sodium or lithium; a compound containing a group 2 element such as magnesium or calcium; a compound of a metal such as aluminum, zinc, manganese, antimony, titanium, tin, zirconium, or germanium: a phosphorous acid compound; a phosphoric acid compound, and an amine compound. Specific examples of the tin compound include dibutyltin oxide, tin octylate, tin dioctylate, and salts thereof. Examples of the titanium compound include: a titanium alkoxide such as tetranormal butyl titanate (Ti(O-n-Bu)$_4$), tetraisopropyl titanate, tetramethyl titanate, or tetrastearyl titanate; a titanium acylate such as polyhydroxytitanium stearate; and a titanium chelate such as titanium tetraacetylacetate, titanium lactate, or titanium triethanol aminate. Examples of the germanium compound include germanium dioxide. Examples of the aluminum compound include polyaluminum hydroxide, aluminum alkoxide, and tributylaluminate. These compounds may be used singly or in combination of two or more types thereof.

The polymerization temperature is not particularly limited, but is preferably 70 to 250° C. The polymerization time is not particularly limited, but is preferably 0.5 to 10 hours. During the polymerization, the pressure inside the reaction system may be reduced as necessary.

When the toner according to an embodiment of the present invention contains a binder resin in addition to the composition according to an embodiment of the present invention, the content ratio between the composition and the binder resin is not particularly limited.

Note that the toner according to an embodiment of the present invention may be particles having a single layer structure or particles having a core-shell structure. The type of a binder resin used for a core particle and a shell portion of the core-shell structure is not particularly limited.

<Colorant>

The toner according to an embodiment of the present invention may further contain a colorant. As the colorant, a generally known dye and pigment can be used.

Examples of a colorant for obtaining a black toner include carbon black, a magnetic material, and iron-titanium composite oxide black. Examples of the carbon black include channel black, furnace black, acetylene black, thermal black, and lamp black. Examples of the magnetic material include ferrite and magnetite.

Examples of a colorant for obtaining a yellow toner include: dyes such as C.I. Solvent Yellow 19, C.I. Solvent Yellow 44, C.I. Solvent Yellow 77, C.I. Solvent Yellow 79, C.I. Solvent Yellow 81, C.I. Solvent Yellow 82, C.I. Solvent Yellow 93, C.I. Solvent Yellow 98, C.I. Solvent Yellow 103, C.I. Solvent Yellow 104, C.I. Solvent Yellow 112, and C.I. Solvent Yellow 162; and pigments such as C.I. Pigment yellow 14, C.I. Pigment yellow 17, C.I. Pigment yellow 74, C.I. Pigment yellow 93, C.I. Pigment yellow 94, C.I. Pigment yellow 138, C.I. Pigment yellow 155, C.I. Pigment yellow 180, and C.I. Pigment yellow 185.

Examples of a colorant for obtaining a magenta toner include: dyes such as C.I. Solvent Red 1, C.I. Solvent Red 49, C.I. Solvent Red 52, C.I. Solvent Red 58, C.I. Solvent Red 63, C.I. Solvent Red 111, and C.I. Solvent Red 122; and pigments such as C.I. Pigment Red 5, C.I. Pigment Red 48:1, C.I. Pigment Red 53:1, C.I. Pigment Red 57:1, C.I. Pigment Red 122, C.I. Pigment Red 139, C.I. Pigment Red 144, C.I. Pigment Red 149, C.I. Pigment Red 166, C.I. Pigment Red 177, C.I. Pigment Red 178, and C.I. Pigment Red 222.

Examples of a colorant for obtaining a cyan toner include: dyes such as C.I. Solvent Blue 25, C.I. Solvent Blue 36, C.I. Solvent Blue 60, C.I. Solvent Blue 70, C.I. Solvent Blue 93, and C.I. Solvent Blue 95; and pigments such as C.I. Pigment Blue 1, C.I. Pigment Blue 7, C.I. Pigment Blue 15, C.I. Pigment Blue 15:3, C.I. Pigment Blue 60, C.I. Pigment Blue 62, C.I. Pigment Blue 66, and C.I. Pigment Blue 76.

Colorants for obtaining toners of colors can be used singly or in combination of two or more types thereof for each of the colors.

The content of the colorant is preferably 0.5 to 20% by mass, and more preferably 2 to 10% by mass in the toner particles (toner matrix particles) before addition of an external additive.

<Release Agent>

The toner according to an embodiment of the present invention may further contain a release agent. By introducing the release agent into the toner, a toner having better fixability and high color reproducibility can be obtained when the toner is thermally fixed under light irradiation.

The release agent used is not particularly limited, and various known waxes can be used. Examples of the wax include a polyolefin such as low molecular weight polypropylene, polyethylene, or oxidized low molecular weight polypropylene, a paraffin wax, and a synthetic ester wax. Above all, a paraffin wax is preferably used from a viewpoint of improving storage stability of the toner.

The content of the release agent in the toner matrix particles is preferably 1 to 30% by mass, and more preferably 3 to 15% by mass.

<Charge Control Agent>

The toner according to an embodiment of the present invention may contain a charge control agent. The charge control agent used is not particularly limited as long as being able to provide a positive or negative charge by frictional charging and being colorless, and various known positively chargeable charge control agents and negatively chargeable charge control agents can be used.

The content of the charge control agent in the toner matrix particles is preferably 0.01 to 30% by mass, and more preferably 0.1 to 10% by mass.

<External Additive>

In order to improve the fluidity, chargeability, cleanability, and the like of the toner, an external additive such as a fluidizing agent, which is a so-called post-treatment agent, or a cleaning aid may be added to the toner matrix particles to obtain the toner according to an embodiment of the present invention.

Examples of the external additive include inorganic particles such as inorganic oxide particles including silica particles, alumina particles, and titanium oxide particles, inorganic stearic acid compound particles including aluminum stearate particles and zinc stearate particles, or inorganic titanic acid compound particles including strontium titanate particles and zinc titanate particles. These inorganic particles may be hydrophobized as necessary. These particles can be used singly or in combination of two or more types thereof.

Among these particles, as the external additive, for example, sol-gel silica particles, silica particles whose surfaces have been hydrophobized (hydrophobic silica particles), and titanium oxide particles (hydrophobic titania particles) are preferable, and at least two of these are more preferably used as the external additive.

The external additive has a number average primary particle diameter preferably within a range of 1 to 200 nm, more preferably within a range of 10 to 180 nm.

The addition amount of the external additive in the toner is preferably 0.05 to 5% by mass, and more preferably 0.1 to 3% by mass.

<Average Particle Diameter of Toner>

The average particle diameter of the toner (and average particle diameter of toner matrix particles) is preferably 4 to 20 μm, and more preferably 5 to 15 μm in terms of volume-based median diameter (D50). When the volume-based median diameter (D50) is within the above range, transfer efficiency is increased, image quality of halftone is improved, and image quality of a thin line, a dot, or the like is improved.

The volume-based median diameter (D50) can be measured and calculated using a measuring device in which a computer system (manufactured by Beckman Coulter, Inc.) having data processing software "Software V 3.51" mounted thereon is connected to "Coulter Counter 3" (manufactured by Beckman Coulter, Inc.).

Specifically, 0.02 g of a measurement sample (toner or toner matrix particles) is added to 20 mL of a surfactant solution (for the purpose of dispersing the toner particles, for example, a surfactant solution obtained by diluting a neutral detergent containing a surfactant component 10 times with pure water) and familiarized. Thereafter, the resulting solution is subjected to ultrasonic dispersion for one minute to prepare a dispersion. This dispersion is injected into a beaker containing "ISOTON II" (manufactured by Beckman Coulter, Inc.) in a sample stand with a pipette until a display concentration of the measuring device reaches 8%.

Here, by setting the display concentration to the above value, a reproducible measured value can be obtained. Then, in the measuring device, the count number of measurement particles is set to 25000, an aperture diameter is set to 50 μm, a measurement range of 1 to 30 μm is divided into 256 parts, and a frequency value is calculated. A particle diameter of 50% from a larger volume integration fraction is taken as the volume-based median diameter (D50).

[Method for Manufacturing Toner]

A method for manufacturing the toner according to an embodiment of the present invention is not particularly limited. For example, when a toner containing only the composition according to an embodiment of the present invention is manufactured, a manufacturing method including: crushing the composition using a device such as a hammer mill, a feather mill, or a counter jet mill; and then performing classification using a dry classifier such as a spin air sieve, a Classiel, or a micron classifier so as to obtain a desired particle diameter can be used. When a toner further containing a colorant is manufactured, the composition and the colorant are dissolved in a solvent in which both the composition and the colorant can be dissolved to form a solution, then the solvent is removed, and then crushing and classification can be performed by a method similar to the above method.

In particular, a toner containing the composition according to an embodiment of the present invention and, as necessary, a binder resin and a colorant is preferably manufactured by a manufacturing method using an emulsion aggregation method that can easily control the particle diameter and the shape.

Such a manufacturing method preferably includes:
(1A) a binder resin particle dispersion preparation step of preparing a dispersion of binder resin particles as necessary;
(1B) a composition particle dispersion preparation step of preparing a dispersion of particles of the composition according to an embodiment of the present invention:
(1C) a colorant particle dispersion preparation step of preparing a dispersion of colorant particles as necessary;
(2) an association step of adding a flocculant to an aqueous medium containing composition particles, and as necessary, binder resin particles and colorant particles to promote salting out and simultaneously performing aggregation and fusion to form associated particles;
(3) an aging step of controlling the shapes of the associated particles to form toner matrix particles;
(4) a filtration and washing step of filtering out the toner matrix particles from the aqueous medium to remove a surfactant and the like from the toner matrix particles;
(5) a drying step of drying the washed toner matrix particles; and
(6) an external additive addition step of adding an external additive to the dried toner matrix particles.

The steps (1A) to (1C) will be described below.

(1A) Binder Resin Particle Dispersion Preparation Step

In this step, resin particles are formed by conventionally known emulsion polymerization or the like, and the resin particles are aggregated and fused to form binder resin particles. For example, a polymerizable monomer constituting a binder resin is put into an aqueous medium and dispersed therein, and the polymerizable monomer is polymerized by a polymerization initiator to prepare a dispersion of binder resin particles.

As the method for obtaining the binder resin particle dispersion, in addition to the method for polymerizing a polymerizable monomer by a polymerization initiator in an aqueous medium, for example, a method for performing a dispersion treatment in an aqueous medium, or a method for dissolving a crystalline resin in a solvent such as ethyl acetate to form a solution, emulsifying and dispersing the solution in an aqueous medium using a disperser, and then removing the solvent may be used.

At this time, the binder resin may contain a release agent in advance as necessary. For the purpose of dispersion, polymerization is preferably performed appropriately in the presence of a known surfactant (for example, an anionic surfactant such as polyoxyethylene (2) sodium dodecyl ether sulfate, sodium dodecyl sulfate, or dodecyl benzene sulfonic acid).

The volume-based median diameter of the binder resin particles in the dispersion is preferably 50 to 300 nm. The volume-based median diameter of the binder resin particles in the dispersion can be measured by a dynamic light scattering method using "Microtrack UPA-150" (manufactured by Nikkiso Co., Ltd.).

(1B) Composition Particle Dispersion Preparation Step

This composition particle dispersion preparation step is a step of dispersing the composition according to an embodiment of the present invention in a form of fine particles in an aqueous medium to prepare a dispersion of particles of the composition.

In preparing a dispersion of particles of the composition, first, an emulsion of the composition is prepared. The emulsion of the composition can be obtained, for example, by dissolving the composition in an organic solvent and then emulsifying the obtained solution in an aqueous medium.

A method for dissolving the composition in an organic solvent is not particularly limited, and examples thereof include a method for adding the composition to an organic solvent and stirring and mixing the resulting mixture such that the composition is dissolved therein. The addition amount of the composition is preferably 5 parts by mass or more and 100 parts by mass or less, and more preferably 10 parts by mass or more and 50 parts by mass or less with respect to 100 parts by mass of the organic solvent.

Next, the obtained solution of the composition and an aqueous medium are mixed and stirred using a known disperser such as a homogenizer. As a result, the composition becomes droplets and is emulsified in the aqueous medium to prepare an emulsion of the composition.

The addition amount of the solution of the composition is preferably 10 parts by mass or more and 110 parts by mass or less with respect to 100 parts by mass of the aqueous medium.

The temperature of each of the solution of the composition and the aqueous medium at the time of mixing the solution of the composition and the aqueous medium is within a temperature range of lower than the boiling point of the organic solvent, preferably 20° C. or higher and 80° C. or lower, and more preferably 30° C. or higher and 75° C. or lower. The temperature of the solution of the composition and the temperature of the aqueous medium at the time of mixing the solution of the composition and the aqueous medium may be the same as or different from each other, and are preferably the same as each other.

As stirring conditions of the disperser, for example, in a case where the volume of a stirring container is 1 to 3 L, the number of rotations is preferably 7000 rpm or more and 20000 rpm or less, and stirring time is preferably 10 minutes or more and 30 minutes or less.

The dispersion of particles of the composition is prepared by removing the organic solvent from the emulsion of the composition. The organic solvent is removed from the emulsion of the composition by a known method such as, air blowing, heating, pressure reduction, or a combination thereof.

As an example, the organic solvent is removed, for example, by heating the emulsion of the composition in an atmosphere of an inert gas such as nitrogen preferably at 25° C. or higher and 90° C. or lower, more preferably at 30° C. or higher and 80° C. or lower until about 80% by mass or more and 95% by mass or less of the initial amount of the organic solvent is removed. As a result, the organic solvent is removed from the aqueous medium to prepare a dispersion of particles of the composition in which particles of the composition are dispersed in the aqueous medium.

The mass average particle diameter of particles of the composition in the dispersion of particles of the composition is preferably 90 nm or more and 1200 nm or less. The mass average particle diameter can be set within the above range by appropriately adjusting the viscosity when the composition is blended with an organic solvent, the blending ratio between the solution of the composition and the aqueous medium, the stirring speed of a disperser when the emulsion of the composition is prepared, and the like. The mass average particle diameter of particles of the composition in the dispersion of particles of the composition can be measured using an electrophoretic light scattering photometer "ELS-800" (manufactured by Otsuka Electronics Co., Ltd.).

<Organic Solvent>

The organic solvent used in this step can be used without particular limitation as long as a polymer and a compound in the composition can be dissolved in the organic solvent. Specific examples of the organic solvent include: an ester such as ethyl acetate or butyl acetate; an ether such as diethyl ether, diisopropyl ether, or tetrahydrofuran; a ketone such as acetone or methyl ethyl ketone; a saturated hydrocarbon such as hexane or heptane; and a halogenated hydrocarbon such as dichloromethane, dichloroethane, or carbon tetrachloride.

These organic solvents can be used singly or in mixture of two or more types thereof. Among these organic solvents, a ketone and a halogenated hydrocarbon are preferable, and methyl ethyl ketone and dichloromethane are more preferable.

<Aqueous Medium>

Examples of the aqueous medium used in this step include water and an aqueous medium mainly containing water and optionally containing a water-soluble solvent such as an alcohol or a glycol, a surfactant, a dispersant, or the like. The aqueous medium is preferably a mixture of water and a surfactant.

Examples of the surfactant include a cationic surfactant, an anionic surfactant, and a nonionic surfactant. Examples of the cationic surfactant include dodecyl ammonium chloride, dodecyl ammonium bromide, dodecyl trimethyl ammonium bromide, dodecyl pyridinium chloride, dodecyl pyridinium bromide, and hexadecyl trimethyl ammonium bromide. Examples of the anionic surfactant include a fatty acid soap such as sodium stearate or sodium dodecanoate, sodium dodecylbenzene sulfonate, and sodium dodecyl sulfate. Examples of the nonionic surfactant include polyoxyethylene dodecyl ether, polyoxyethylene hexadecyl ether, polyoxyethylene nonyl phenyl ether, polyoxyethylene dodecyl ether, polyoxyethylene sorbitan monooleate ether, and monodecanoyl sucrose.

These surfactants can be used singly or in combination of two or more types thereof. Among the surfactants, an anionic surfactant is preferably used, and sodium dodecylbenzene sulfonate is more preferably used.

The addition amount of the surfactant is preferably 0.01 parts by mass or more and 10 parts by mass or less, and more preferably 0.04 parts by mass or more and 1 part by mass or less with respect to 100 parts by mass of the aqueous medium.

(1C) Colorant Particle Dispersion Preparation Step

This colorant particle dispersion preparation step is a step of dispersing a colorant in a form of fine particles in an aqueous medium to prepare a dispersion of colorant particles.

The colorant can be dispersed using mechanical energy. The number-based median diameter of the colorant particles in the dispersion is preferably 10 to 300 nm, and more preferably 50 to 200 nm. The number-based median diameter of the colorant particles can be measured using an electrophoretic light scattering photometer "ELS-800" (manufactured by Otsuka Electronics Co., Ltd.).

The steps of association step (2) to external additive addition step (6) can be performed according to conventionally known various methods.

Note that the flocculant used in associative step (2) is not particularly limited, but is suitably selected from metal salts. Examples of the metal salts include: a monovalent metal salt such as a salt of an alkali metal such as sodium, potassium, or lithium; a divalent metal salt of calcium, magnesium, manganese, or copper; and a trivalent metal salt of iron or aluminum. Specific examples of the metal salts include sodium chloride, potassium chloride, lithium chloride, calcium chloride, magnesium chloride, zinc chloride, copper sulfate, magnesium sulfate, and manganese sulfate. Above all, a divalent metal salt is particularly preferably used because of being able to promote aggregation in a smaller amount. These metal salts can be used singly or in combination of two or more types thereof.

[Developer]

For example, the toner according to an embodiment of the present invention may be used as a one-component magnetic toner containing a magnetic material, may be used as a two-component developer mixed with a so-called carrier, or may be used singly as a non-magnetic toner, any of which can be suitably used.

Examples of the magnetic material include magnetite, γ-hematite, and various ferrites.

Examples of the carrier contained in the two-component developer include magnetic particles made of a conventionally known material such as a metal including iron, steel, nickel, cobalt, ferrite, and magnetite, or alloys of those metals with a metal such as aluminum or lead.

The carrier may be a coated carrier obtained by coating surfaces of magnetic particles with a coating agent such as a resin, or may be a resin dispersion type carrier obtained by dispersing magnetic material powder in a binder resin. The coating resin is not particularly limited, but examples thereof include an olefin resin, an acrylic resin, a styrene resin, a styrene acrylic resin, a silicone resin, a polyester resin, and a fluorocarbon resin. A resin for constituting the resin dispersion type carrier particles is not particularly limited, and a known resin can be used. Examples thereof include an acrylic resin, a styrene acrylic resin, a polyester resin, a fluorocarbon resin, and a phenol resin.

The volume-based median diameter of the carrier is preferably 20 to 100 μm, and more preferably 25 to 80 μm. The volume-based median diameter of the carrier can be typically measured with a laser diffraction type particle size distribution measuring device "HELOS" (manufactured by SYMPATEC Gmbh) equipped with a wet type disperser.

The mixing amount of the toner is preferably 2 to 10% by mass, in which the total mass of the toner and the carrier is 100% by mass.

[Image Forming Method]

The toner according to an embodiment of the present invention can be used in various known electrophotographic image forming methods. For example, the toner can be used in a monochrome image forming method or a full color image forming method. In the full color image forming method, the toner according to an embodiment of the present invention can be applied to any image forming method such as a 4-cycle image forming method including four types of color developing devices for yellow, magenta, cyan, and black and one photoreceptor, or a tandem type image forming method in which an image forming unit including a color developing device for each color and a photoreceptor is mounted for each color.

An image forming method according to an embodiment of the present invention includes 1) a step of forming a toner image made of the toner according to an embodiment of the present invention on a recording medium, and 2) irradiating the toner image with light to soften the toner image. Such an embodiment provides excellent fixability and higher image quality.

Regarding Step 1)

In this step, a toner image containing the toner according to an embodiment of the present invention is formed on a recording medium.

(Recording Medium)

The recording medium is a member for holding a toner image. Examples of the recording medium include coated printing paper such as plain paper, high quality paper, art paper, or coated paper, commercially available Japanese paper or postcard paper, a resin film for OHP or a packaging material, and cloth.

The recording medium may have a sheet shape with a predetermined size, or may have a long shape to be wound into a roll after a toner image is fixed onto the recording medium.

For example, by transferring a toner image on a photoreceptor onto a recording medium, the toner image can be formed as described later.

Regarding Step 2)

In this step, the formed toner image is irradiated with light to soften the toner image. As a result, the toner image can be bonded onto the recording medium.

The wavelength of the irradiation light is not particularly limited as long as being able to sufficiently soften a toner image by photothermal conversion or the like by a compound and a polymer contained in the composition in the toner, but is preferably 280 nm or more and 480 nm or less. Within the above range, the toner image can be softened more efficiently. The light irradiation amount is preferably 0.1 to 200 $J/cm^2$, more preferably 0.1 to 100 $J/cm^2$, and still more preferably 0.1 to 50 $J/cm^2$ from a similar viewpoint.

Light irradiation can be performed using a light source such as a light emitting diode (LED) or a laser light source as described later. In addition, as described later, heating may be further performed in addition to light irradiation.

After step 2), as necessary, 3) a step of pressurizing the softened toner image may be further performed. Such an embodiment enhances the fixability.

Regarding step 3)

In this step, the softened toner image is pressurized.

A pressure for pressurizing the toner image on the recording medium is not particularly limited, but is preferably 0.01 to 5.0 MPa, and more preferably 0.05 to 1.0 MPa. By setting the pressure to 0.01 MPa or more, the deformation amount of the toner image can be increased. Therefore, the contact area between the toner image and a recording sheet S increases, and the fixability of an image is further enhanced easily. In addition, by setting the pressure to 5.0 MPa or less, shock noise during pressurization can be suppressed.

The pressurization step may be performed before or simultaneously with the step of irradiating a toner image with light to soften the toner image (step 2) described above). However, the pressurization step is preferably performed after light irradiation because a toner image in a softened state in advance can be pressurized and as a result, the fixability of an image is further enhanced.

In the pressurization step, the softened toner image may be further heated. That is, the pressurization step may be performed while the toner image is heated. The temperature at that time (for example, the temperature of a pressurizing member) is preferably 15° C. or higher, more preferably 20° C. or higher, still more preferably higher than 20° C., further still more preferably 30° C. or higher, and further still more preferably 40° C. or higher. Such an embodiment remarkably enhances the fixability. The upper limit is not particularly limited, but is, for example, 200° C. or lower, 150° C. or lower, or 100° C. or lower.

The heating temperature of a toner image (surface temperature of a toner image at the time of heating) is preferably (Tg+20) to (Tg+100°) C, and more preferably (Tg+25) to (Tg+80°) C when Tg represents the glass transition temperature of the toner. If the surface temperature of the toner image is (Tg+20°) C or higher, the toner image is easily deformed by pressurization. If the surface temperature is (Tg+100°) C or lower, hot offset is easily suppressed. Note that the hot offset refers to a phenomenon that a part of the toner is transferred to a pressurizing member such as a roller in the fixing step, and a toner layer is divided.

Before step 2), step 4) of preheating the toner image may be performed as necessary. By further performing step 4) of preheating the toner image before step 2) in this manner, sensitivity of the composition according to an embodiment of the present invention to light can be further enhanced. As a result, even if the composition is a polymer, the sensitivity to light is less likely to be impaired. Therefore, melting or softening of the toner image by light irradiation is easily promoted.

FIG. 1 is a schematic configuration diagram illustrating an image forming apparatus 100 used in an image forming method according to an embodiment of the present invention. However, the image forming apparatus used in the present invention is not limited to the following forms and illustrated examples. FIG. 1 illustrates an example of the monochrome image forming apparatus 100, but the present invention can also be applied to a color image forming apparatus.

The image forming apparatus 100 is an apparatus that forms an image on a recording sheet S as a recording medium, includes an image reader 71 and an automatic document feeder 72, and forms an image on the recording sheet S conveyed by a sheet conveyance system 7 with an image forming unit 10, an irradiation unit 40, and a pressure bonding unit 9.

The image forming apparatus 100 uses the recording sheet S as a recording medium. However, as described above, the medium on which an image is formed may be other than a sheet.

A document d placed on a document table of the automatic document feeder 72 is scanned and exposed by an optical system of a scanning exposure device of the image reader 71, and read by an image sensor CCD. An analog signal photoelectrically converted by the image sensor CCD is subjected to analog processing, A/D conversion, shading correction, image compression processing, and the like in the image processor 20 and then input to an exposure unit 3 of the image forming unit 10.

The sheet conveyance system 7 includes a plurality of trays 16, a plurality of sheet feeders 11, a conveyance roller 12, a conveyance belt 13, and the like. The trays 16 store recording sheets S having determined sizes, respectively, operate the sheet feeders 11 of the trays 16 determined according to an instruction from a control unit 90, and supply the recording sheets S. The conveyance roller 12 conveys the recording sheet S fed from each of the trays 16 by each of the sheet feeders 11 or the recording sheet S carried from a manual sheet feeder 15 to the image forming unit 10.

In the image forming unit 10, a charger 2, the exposure unit 3, a developing unit 4, a transfer unit 5, a charge remover (not illustrated), and a cleaner 8 are disposed in this order around the photoreceptor 1 in a rotational direction of the photoreceptor 1.

The photoreceptor 1, which is an image carrier, is an image carrier on a surface of which a photoconductive layer is formed, and is rotatable in an arrow direction in FIG. 1 by a driving device (not illustrated). Around the photoreceptor 1, a temperature and humidity meter 17 that detects a temperature and a humidity in the image forming apparatus 100 is disposed.

The charger 2 uniformly charges a surface of the photoreceptor 1 to uniformly charge the surface of the photoreceptor 1. The exposure unit 3 includes a beam emitting light source such as a laser diode, and irradiates the surface of the charged photoreceptor 1 with beam light to dissipate charges of a portion irradiated with the beam light, and forms an electrostatic latent image according to image data on the photoreceptor 1. The developing unit 4 supplies a toner contained therein to the photoreceptor 1 to form a toner image based on the electrostatic latent image on the surface of the photoreceptor 1.

The transfer unit 5 is disposed so as to face the photoreceptor 1 via the recording sheet S, and transfers a toner image onto the recording sheet S. The charge remover removes charges on the photoreceptor 1 after the toner image is transferred. The cleaner 8 includes a blade 85. The blade 85 cleans the surface of the photoreceptor 1 to remove the developer remaining on the surface of the photoreceptor 1.

The recording sheet S onto which the toner image has been transferred is conveyed to the pressure bonding unit 9 by the conveyance belt 13. The pressure bonding unit 9 is arbitrarily disposed, and applies only pressure or heat and pressure to the recording sheet S onto which the toner image has been transferred by pressurizing members 91 and 92 to perform a fixing treatment, and thereby fixes an image onto the recording sheet S. The recording sheet S onto which the image has been fixed is conveyed to a sheet discharger 14 by a conveyance roller and discharged through the sheet discharger 14 to the outside of the apparatus.

In addition, the image forming apparatus 100 includes a sheet reversing unit 24, and can convey the thermally fixed recording sheet S to the sheet reversing unit 24 before the sheet discharger 14, can turn the recording sheet S upside down, and can discharge the recording sheet S, or can convey the recording sheet S that has been turned upside down to the image forming unit 10 again and can form images on both sides of the recording sheet S.

<Irradiation Unit>

Figure 2:
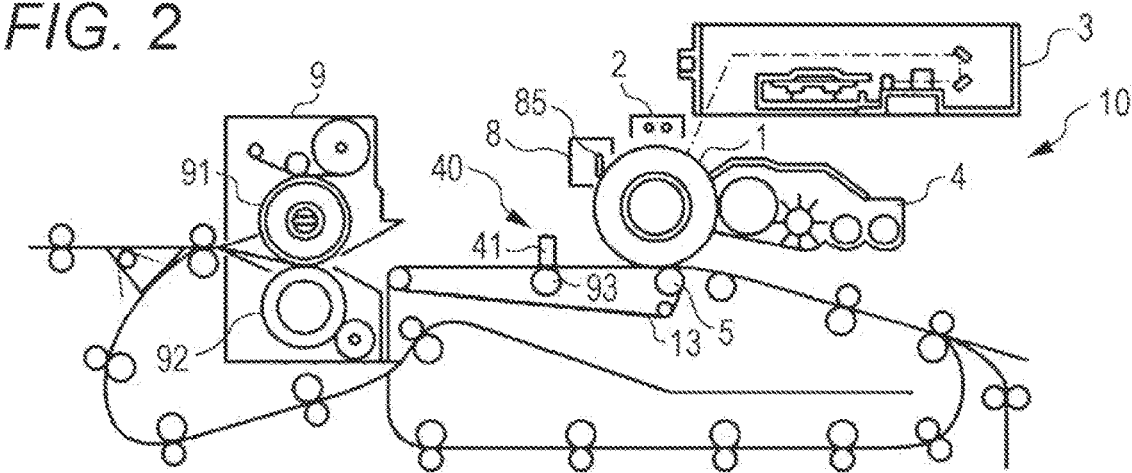
FIG. 2 is a schematic configuration diagram of an irradiation unit in the image forming apparatus.

FIG. 2 is a schematic configuration diagram of the irradiation unit 40 in the image forming apparatus 100.

The image forming apparatus 100 according to an embodiment of the present invention includes the irradiation unit 40. The irradiation unit 40 includes a light source 41 and a heating member 93. Examples of a device constituting the light source 41 include a light emitting diode (LED) and a laser light source.

The light source 41 irradiates a toner image formed on a recording medium with light to soften the toner image. Conditions of light irradiation are not particularly limited as long as the composition according to an embodiment of the present invention contained in a toner of a developer is melted and fluidized. The wavelength of light with which the toner image is irradiated may be any wavelength as long as the composition can be fluidized sufficiently, and is preferably within a range of 280 nm or more and 480 nm or less, more preferably within a range of 300 nm or more and 420 nm or less, and still more preferably within a range of 330 nm or more and 420 nm or less. The light irradiation amount in the light source 41 may be any amount as long as the composition can be fluidized sufficiently, and is for example, within a range of 0.1 J/cm$^2$ or more and 200 J/cm$^2$ or less, preferably 0.1 J/cm$^2$ or more and 100 J/cm$^2$ or less, more preferably within a range of 0.1 J/cm$^2$ or more and 50 J/cm$^2$ or less, and still more preferably within a range of 0.1 J/cm$^2$ or more and 30 J/cm$^2$ or less.

When the toner image is irradiated with light by the light source 41 to soften the toner image, the toner image may be heated by the heating member 93 under light irradiation. As a result, the softening and melting of the toner image can proceed more efficiently. The heating temperature at this time is, for example, within a range of 20° C. or higher and 200° C. or lower, and preferably within a range of 20° C. or higher and 150° C. or lower.

By leaving the softened toner image at room temperature (within a range of 25±15° C.), heating the toner image, or irradiating the toner image with visible light, the toner image can be solidified and fixed onto a recording medium. Note that as will be described later, the fixing step preferably further includes a step of pressurizing the softened toner image. In the pressurization step, the softened toner image is preferably further heated.

The light source 41 emits light toward a first surface of a recording sheet S holding a toner image on a photoreceptor side, and is disposed on the photoreceptor side with respect to the recording sheet S surface nipped by the photoreceptor 1 and a transfer roller 5 which is the transfer unit. The heating member 93 is disposed on the side opposite to the light source 41 with respect to the recording sheet S surface. The light source 41 and the heating member 93 are disposed in a conveyance direction (sheet conveyance direction) of the recording sheet S.

The light source 41 and the heating member 93 are disposed on a downstream side in the sheet conveyance direction with respect to the nip position by the photoreceptor 1 and the transfer roller 5 and on an upstream side in the sheet conveyance direction with respect to the pressure bonding unit 9.

By the image forming method according to an embodiment of the present invention, a uniform potential is applied to the photoreceptor 1 by the charger 2 to charge the photoreceptor 1. Thereafter, the photoreceptor 1 is scanned with a light flux emitted by the exposure unit 3 based on original image data to form an electrostatic latent image. Next, a developer containing a toner containing the composition according to an embodiment of the present invention is supplied onto the photoreceptor 1 by the developing unit 4.

When the recording sheet S is conveyed from the tray 16 to the image forming unit 10 in synchronization with the timing when a toner image carried on a surface of the photoreceptor 1 reaches the position of the transfer roller 5 which is the transfer unit by rotation of the photoreceptor 1, the toner image on the photoreceptor 1 is transferred onto the recording sheet S nipped by the transfer roller 5 and the photoreceptor 1 by a transfer bias applied to the transfer roller 5.

The transfer unit 5 also serves as a pressurizing member, and can reliably bring the toner image into close contact with the recording sheet S while transferring the toner image from the photoreceptor 1 onto the recording sheet S.

After the toner image is transferred onto the recording sheet S, the blade 85 of the cleaner 8 removes the developer remaining on the surface of the photoreceptor 1.

In a process in which the recording sheet S onto which the toner image has been transferred is conveyed to the pressure bonding unit 9 by the conveyance belt 13, the light source 41 irradiates the toner image transferred onto the recording sheet S with light. By emitting light toward the toner image on the first surface of the recording sheet S from the light source 41, the toner image can be melted more reliably, and the fixability of the toner image onto the recording sheet S can be enhanced.

When the recording sheet S holding the toner image reaches the pressure bonding unit 9 by the conveyance belt 13, the pressurizing members 91 and 92 pressure-bond the toner image to the first surface of the recording sheet S. The toner image is softened by light irradiation from the light source 41 before the toner image is fixed by the pressure bonding unit 9. Therefore, energy required for pressure-bonding the image to the recording sheet S can be reduced. Furthermore, in the step of solidifying the toner image and fixing the toner image onto the recording medium, the toner image is pressurized by the pressurizing members 91 and 92, and the fixability of the toner image onto the recording sheet S is thereby further enhanced.

A pressure for pressurizing the toner image on the recording medium is not particularly limited, but is preferably 0.01 to 5.0 MPa, and more preferably 0.05 to 1.0 MPa. By setting the pressure to 0.01 MPa or more, the deformation amount of the toner image can be increased. Therefore, the contact area between the toner image and a recording sheet S increases, and the fixability of an image is further enhanced easily. In addition, by setting the pressure to 5.0 MPa or less, shock noise during pressurization can be suppressed.

In the pressurization step, the toner image is preferably further heated. By applying pressure and heat by the pressurizing members 91 and 92, the fixability of the toner image onto the recording sheet S is further enhanced. Specifically, when the recording sheet S passes between the pressurizing members 91 and 92, the toner image softened by light irradiation is pressurized in a state of being further softened by heating. As a result, the fixability of the toner image onto the recording sheet S is further enhanced.

The heating temperature when the toner image is further heated in the pressurization step is preferably 15° C. or higher, more preferably 20° C. or higher, still more preferably higher than 20° C., further still more preferably 30° C. or higher, and further still more preferably 40° C. or higher. Such an embodiment remarkably enhances the fixability. The upper limit is not particularly limited, but is, for example, 200° C. or lower, 150° C. or lower, or 100° C. or lower.

The toner image pressure-bonded by the pressurizing members 91 and 92 is solidified and fixed onto the recording sheet S.

That is, in an embodiment of the present invention, a fixing device includes a pressure bonding unit including a pressurizing member. In an embodiment of the present invention, the pressurizing member includes a heating means.

In an embodiment of the present invention, the temperature of the pressurizing member is preferably 15° C. or higher, more preferably 20° C. or higher, still more preferably higher than 20° C., further still more preferably 30° C. or higher, and further still more preferably 40° C. or higher. The upper limit is not particularly limited, but is, for example, 200° C. or lower, 150° C. or lower, or 100° C. or lower.

When images are formed on both sides of the recording sheet S, the pressure-bonded recording sheet S is conveyed to the sheet reversing unit 24 before the sheet discharger 14, turned upside down, and discharged, or the recording sheet S that has been turned upside down is conveyed to the image forming unit 10 again.

(Photoresponsive Adhesive)

Since the composition according to an embodiment of the present invention is fluidized by light irradiation and reversibly non-fluidized, a photoresponsive adhesive (photosensitive adhesive) that can be repeatedly used can be prepared using the composition according to an embodiment of the present invention. For example, the composition according to an embodiment of the present invention can be applied to various bonding techniques as a photoresponsive adhesive that can be repeatedly photoattached and photodetached in response to a change in viscosity (coefficient of friction). That is, an embodiment of the present invention is a photoresponsive adhesive containing the composition according to an embodiment of the present invention.

The photoresponsive adhesive according to an embodiment of the present invention can be used for temporary fixing that can be used repeatedly, and is also suitable for recycling, but is not limited thereto.

(Optical Switching Material)

Since the composition according to an embodiment of the present invention is fluidized by light irradiation and reversibly non-fluidized, an optical switching material can be prepared using the composition according to an embodiment of the present invention. For example, an optical switching material can be prepared by utilizing a change in color or polarity, mass transfer, a change in orientation, a change in viscosity, and a change in surface tension due to photoisomerization. For example, in a liquid crystal material or the like, the composition according to an embodiment of the present invention can be applied to patterning drawing that can be repeatedly rewritten in response to a change in molecular orientation due to photoisomerization. In addition, for example, a surface of a polymer film can be finely processed by utilizing a change in surface tension due to light irradiation and the resulting mass transfer. That is, an embodiment of the present invention is an optical switching material containing the composition according to an embodiment of the present invention.

The optical switching material according to an embodiment of the present invention can be used for a liquid crystal display material and surface processing of a polymer film, but is not limited thereto.

EXAMPLES

Hereinafter, the present invention will be specifically described with reference to Examples, but the present invention is not limited thereto.

First, polymers 1 to 3 and 5 to 18 of Table 3 below containing compounds 1, 2, 6, and 10 of Table 1 above and structural units 1 to 3, 5, and 18 of Table 2 above were prepared.

Synthesis of Compound 1

4-Hexyloxyaniline (7.7 mmol), 5-methylthiophene-2-carboxyaldehyde (7.7 mmol), and 20 ml of ethanol were put into a 100 ml four-neck flask equipped with a cooling tube, a nitrogen introduction tube, and a thermometer, and the resulting mixture was heated and stirred. The reaction solution was subjected to suction filtration, and the obtained powder was washed with cooling ethanol. Furthermore, the resulting product was recrystallized with methanol/ethanol to obtain compound 1, which is a target product, in a yield of 42%.

[Chemical formula 19]

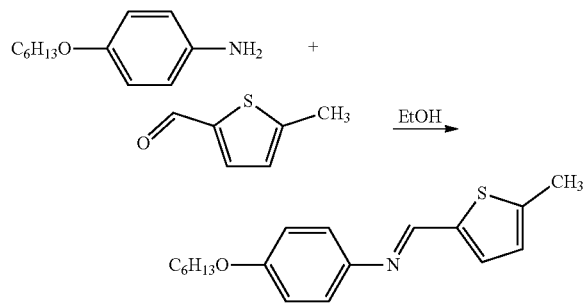

Generation of compound 1 was confirmed by $^1$H NMR. $^1$H NMR (400 MHz, CDCl$_3$):8.35 ppm(s, 1H, CH=N), 7.39 ppm(d, 2H, aryl), 7.08 ppm (d, 1H, thiophene), 6.96 ppm (d, 2H, aryl), 6.67 ppm(d, 2H, thiophene), 4.11 ppm (t, 2H, methylene), 2.44 ppm(s, 3H, methyl), 1.80 ppm(m, 2H, methylene), 1.47 ppm(m, 2H, methylene), 1.37 ppm (m, 4H, methylene), 0.89 ppm (t, 3H, methyl)

Synthesis of Compound 2

Compound 2 was synthesized in a similar manner to the synthesis of compound 1 above except that 5-methylthiophene-2-carboxyaldehyde (7.7 mmol) was changed to N-methylpyrrole-2-carboxyaldehyde (7.7 mmol) in the synthesis of compound 1. Similarly, generation of the compound was confirmed by $^1$H NMR, and it was found that the target compound had been obtained.

Synthesis of Compound 10

Compound 10 was synthesized in a similar manner to the synthesis of compound 1 above except that 5-methylthiophene-2-carboxyaldehyde (7.7 mmol) was changed to 1-methyl-1H-pyrazole-4-carboxyaldehyde (7.7 mmol) in the synthesis of compound 1. Similarly, generation of the compound was confirmed by $^1$H NMR, and it was found that the target compound had been obtained.

Synthesis of Compound 6

To 4-aminophenol (6.54 g, 60 mmol), 75 mL of 2.4 N hydrochloric acid was added. Thereafter, to the resulting mixture, a solution obtained by dissolving sodium nitrite (4.98 g, 72 mmol) in 6 mL of distilled water was added while being cooled and stirred at 0° C., and the resulting mixture was continuously stirred at 0° C. for 60 minutes. To this solution, a mixed solution of o-cresol (6.48 g, 60 mmol) and 24 mL of a 20% sodium hydroxide aqueous solution was added, and the resulting mixture was stirred for 20 hours. The precipitated precipitate was filtered, and the solid was washed with water. The obtained solid was purified by silica gel column chromatography using a mixed solution of ethyl acetate and hexane as a developing solvent, and recrystallized with a mixed solvent of acetone and hexane to obtain intermediate A. To this intermediate A (2.28 g, 10 mmol), 100 mL of DMF, 1-bromohexane (9.9 g, 60 mmol), and potassium carbonate (6.9 g, 50 mmol) were added. The resulting mixture was stirred at 80° C. for two hours and then continuously stirred at room temperature for 20 hours. The solvent was distilled off under reduced pressure. Thereafter, the residue was extracted with ethyl acetate. The organic layer was washed with saturated brine, and then dried over anhydrous magnesium sulfate. The obtained product was filtered. Thereafter, the solvent was distilled off under reduced pressure, and the obtained solid was purified by silica gel column chromatography using a mixed solution of ethyl acetate and hexane as a developing solvent to obtain compound 6 which is an azobenzene derivative.

[Chemical formula 20]

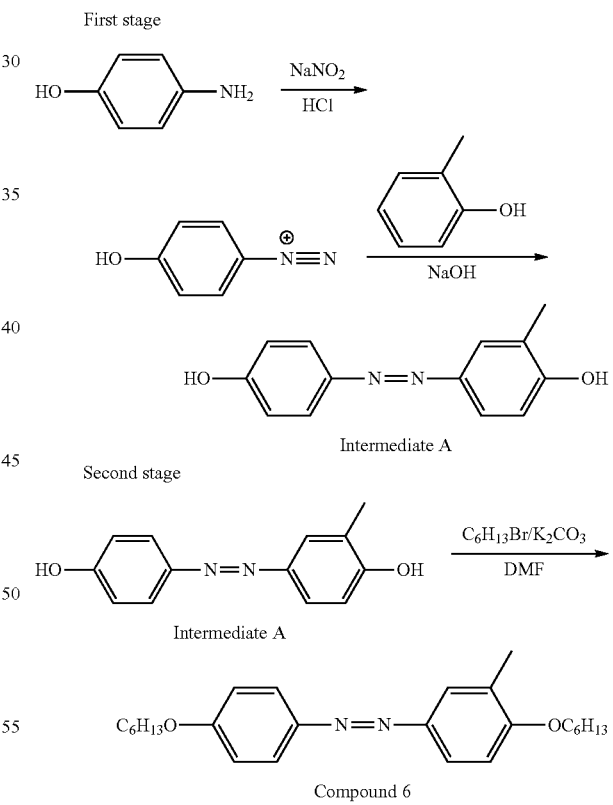

Synthesis of Polymer 1

Synthesis of Azomethine Derivative Monomer 1

4-Aminophenol (5 g, 0.046 mol), 5-methylthiophene-2-carboxyaldehyde (5.8 g, 0.046 mol), and 100 ml of ethanol were put into a 100 ml four-neck flask, and the resulting mixture was heated and stirred. The reaction solution was subjected to suction filtration, and the obtained powder was washed with cooling ethanol. Furthermore, the resulting product was recrystallized with methanol/ethanol to obtain target product 1.

[Chemical formula 21]

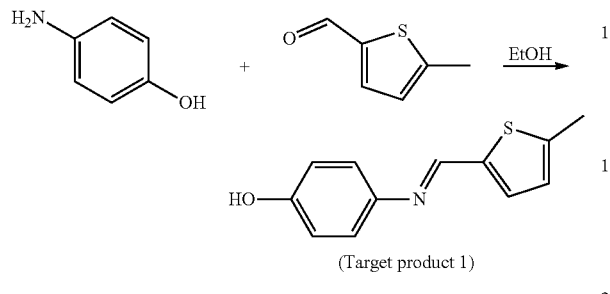

(Target product 1)

Subsequently, in a 200 ml four-neck flask, target product 1 (5 g, 0.023 mol) obtained above was dissolved in 25 ml of dimethylformamide (DMF). To the resulting solution, 4.88 g (0.035 mol) of potassium carbonate was added, and the resulting mixture was stirred while being maintained at 30° C. To this solution, 10.2 mg (0.06 mmol) of potassium iodide and 6-chloro-1-hexanol (3.54 g, 0.026 mol) were added and caused a reaction therebetween at 110° C. The resulting product was cooled to room temperature, added to 650 g of ice, and then filtered. The crystals were dispersed in 400 ml of water, and the resulting dispersion was stirred overnight, washed, filtered, and dried. Furthermore, the resulting product was recrystallized with ethanol to obtain target product 2.

[Chemical formula 22]

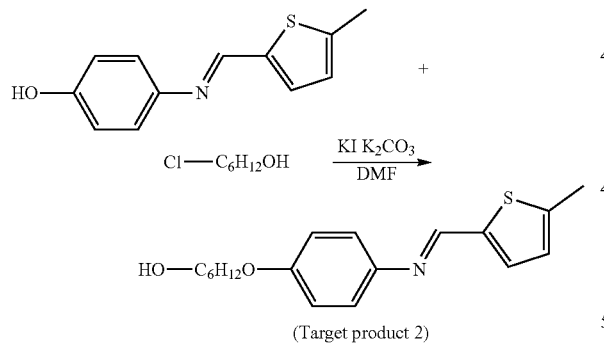

(Target product 2)

Next, into a 100 ml four-neck flask, target product 2 (3 g. 0.001 mol) obtained above, 1.34 ml (0.001 mol) of triethylamine, and 30 ml of dichloromethane were put. At this time, the raw materials were in a dispersed state. A solution obtained by dissolving 1.04 g (0.011 mol) of acrylic acid chloride in 10 ml of dichloromethane while the internal temperature thereof was maintained at 0° C. was added dropwise while the internal temperature thereof was maintained at 0 to 5° C. As the dropwise addition advanced, the raw materials were dissolved.

After completion of the dropwise addition, the temperature of the reaction solution was returned to room temperature, and the reaction solution was stirred. After completion of the reaction, dichloromethane was concentrated and removed. The residue was dissolved in ethyl acetate, and washed with dilute hydrochloric acid, a sodium hydrogen carbonate aqueous solution, and a saturated salt solution. An organic layer was dried over magnesium sulfate and then concentrated. The obtained orange crystals were purified with a silica gel column (ethyl acetate/heptane=1/5) to obtain azomethine derivative monomer 1 having structural unit 1.

[Chemical formula 23]

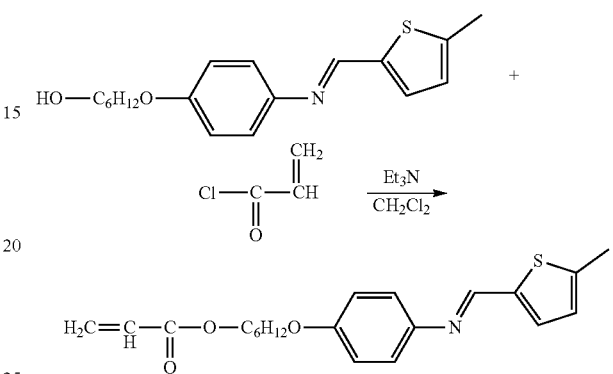

Synthesis of Polymer 1

In a 100 ml four-neck flask, 1.5 g (4.096 mmol) of azomethine derivative monomer 1 obtained above, 5 mg (0.023 mmol) of 4-cyanopentanoic acid dithiobenzoate, and 1 mg (0.006 mmol) of AIBN were dissolved in 4 ml of anisole. Then, freeze degassing was performed to obtain an argon gas atmosphere. Thereafter, the temperature was raised to 75° C., and the solution was stirred to perform polymerization. To the obtained polymer solution, 40 ml of methanol was gradually added dropwise. Thereafter, THF was added thereto to remove unreacted azomethine derivative monomer 1. The separated polymer solution was dried in a vacuum drying furnace at 40° C. for 24 hours to obtain polymer 1. The number average molecular weight Mn of polymer 1 thus obtained was Measured by the GPC method and found to be 12000.

[Chemical formula 24]

Polymer 1

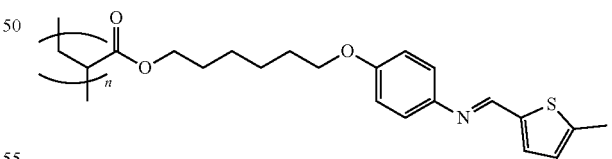

Synthesis of Polymers 2, 3, and 18

Polymers 2, 3, and 18 having structural units 2, 3, and 18, respectively, were obtained by using corresponding raw materials and a similar method to the synthesis of polymer 1.

Specifically, polymer 2 was synthesized by a similar method to the synthesis of polymer 1 except that 4-aminophenol was changed to 3-aminophenol in the synthesis of azomethine derivative monomer 1.

Polymer 3 was synthesized by a similar method to the synthesis of polymer 1 except that 5-methylthiophene-2-carboxyaldehyde was changed to N-hexylpyrrole-3-carboxyaldehyde in the synthesis of azomethine derivative monomer 1.

Polymer 18 was synthesized by a similar method to the synthesis of polymer 1 except that 5-methylthiophene-2-carboxyaldehyde was changed to 1-methyl-1H-pyrazole-4-carboxyaldehyde, and 6-chloro-1-hexanol was changed to 10-chloro-1-decanol in the synthesis of azomethine derivative monomer 1.

Note that in the preparation of polymers 2, 3, and 18 and the following polymers, the amount of each raw material added and reaction conditions were appropriately adjusted as necessary.

Synthesis of Polymer 51

4-Hexylaniline (11 g, 0.0643 mol) and 100 ml of acetone were added under an argon flow in a dark room, and 26 ml of HClaq, was added dropwise thereto while being cooled. Furthermore, NaNO$_2$aq. (NaNO$_2$ 4.6 g/H$_2$O 10 ml) was added dropwise thereto, and the resulting mixture was stirred at 0° C. or lower for 30 minutes. To this preparation, 26 ml of 20% NaOHaq. and 6 g of phenol were added dropwise, and the resulting mixture was stirred at room temperature. Thereafter, 64 ml of HClaq, was added dropwise thereto, and the resulting mixture was separated with toluene/water. The obtained organic layer was purified with a silica gel column (toluene) to obtain target product 1'.

[Chemical formula 25]

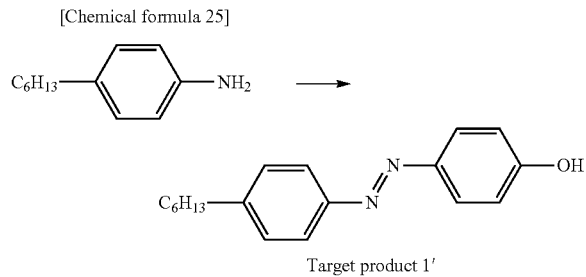

Target product 1'

Subsequently, azobenzene derivative monomer 5 was obtained by a similar method to the synthesis of azomethine derivative monomer 1 except that target product 1' prepared above was used instead of target product 1, and 10-chloro-1-decanol was used instead of 6-chloro-1-hexanol in the synthesis of azomethine derivative monomer 1. Polymer 5 was obtained by a similar method to the synthesis of polymer 1 except that azobenzene derivative monomer 5 was used instead of azomethine derivative monomer 1.

Synthesis of Polymers 6 to 9

Polymers 6 to 8 were each prepared by a similar method to the synthesis of polymer 1 except that the amount of azomethine derivative monomer 1 was changed from 1.5 g to 1.2 g, and 0.3 g of styrene, 0.3 g of ethyl acrylate, and 0.3 g of n-butyl methacrylate were added. Polymer 9 was prepared by a similar method to the synthesis of polymer 1 except that the amount of azomethine derivative monomer 1 was changed from 1.5 g to 1.2 g, and 0.15 g of styrene and 0.15 g of methyl acrylate were added.

Synthesis of Polymer 10

Synthesis of Macroinitiator 10

2,2'-Bipyridyl (230 mg, 1.47 mmol) was put into a 100 ml eggplant flask. Cu(I)Br (95 mg, 0.66 mmol), styrene (15 g, 144 mmol), and 2-ethyl bromoisobutyrate (35 mg. 0.18 mmol) were further added to the eggplant flask in a glove box under a nitrogen atmosphere, and the eggplant flask was sealed. The resulting mixture was heated and stirred in an oil bath at 100° C. Thereafter, an appropriate amount of tetrahydrofuran was added thereto, and the resulting mixture was caused to pass through a neutral alumina column. The resulting product was purified by reprecipitation and centrifugation with methanol to obtain macroinitiator 10. The number average molecular weight (P Mn) of macroinitiator 10 thus obtained was measured by the GPC method and found to be 1100.

Synthesis of Polymer 10

Azomethine derivative monomer 1 (16 g, 38 mmol) obtained above and macroinitiator 10 (0.92 g, 0.18 mmol) obtained above were put into a 100 ml eggplant flask. Cu(I)CI (29 mg, 0.29 mmol), 1,1,4,7,10,10-hexamethyltriethylenetetramine (136 mg, 0.59 mmol), and anisole (4.9 g, 41.1 mmol) as a solvent were further added to the eggplant flask in a glove box under a nitrogen atmosphere, and the eggplant flask was sealed. Then, the resulting mixture was heated and stirred in an oil bath at 80° C. Thereafter, an appropriate amount of chloroform was added thereto, and the resulting mixture was caused to pass through a basic alumina column. The resulting product was purified by reprecipitation and centrifugation with methanol to obtain polymer 10. The total number average molecular weight Mn of polymer 10 thus obtained was measured by the GPC method and found to be 5600. From this value, the number average molecular weight (a Mn) of the structural unit derived from the azomethine derivative is determined to be 4500.

Synthesis of Polymer 11

Synthesis of Macroinitiator 11

Macroinitiator 11 was obtained by a similar method to the synthesis of macroinitiator 10 except that ethyl 2-bromoisobutyrate was changed to α,α'-dibromo-p-xylene in the synthesis of macroinitiator 10.

Synthesis of Polymer 11

Polymer 11 was obtained by a similar method to the synthesis of polymer 10 except that macroinitiator 10 was changed to macroinitiator 11 in the synthesis of polymer 10.

Synthesis of Polymer 12

Synthesis of Macroinitiator 12

Macroinitiator 12 was obtained by a similar method to the synthesis of macroinitiator 10 except that ethyl 2-bromoisobutyrate was changed to ethylene bis(2-bromoisobutyrate), 2,2'-bipyridyl was changed to 1,1,4,7,10,10-hexamethyltriethylenetetramine, styrene was changed to azomethine derivative monomer 1, and anisole was further added in the synthesis of macroinitiator 10.

Synthesis of Polymer 12

Polymer 12 was obtained by a similar method to the synthesis of polymer 10 except that macroinitiator 10 was changed to macroinitiator 12,1,1,4,7,10,10-hexamethyltriethylenetetramine was changed to 2,2'-bipyridyl, azomethine derivative monomer 1 was changed to styrene, and anisole was removed in the synthesis of polymer 10.

Synthesis of Polymer 13

<Synthesis of Macroinitiator 13>

Macroinitiator 13 having a similar structure to macroinitiator 10 and a number average molecular weight (βMn) of 7000 was obtained by appropriately adjusting the heating and stirring time in an oil bath at 100° C. in the synthesis of macroinitiator 10.

Synthesis of Polymer 13

Polymer 13 constituted by a similar structural unit to polymer 10 and having a total number average molecular weight Mn of 7500 was obtained by appropriately adjusting the heating and stirring time in an oil bath at 80° C. in the synthesis of polymer 10. In polymer 13, the number average molecular weight (a Mn) of a structural unit derived from an azomethine derivative was 500.

Synthesis of Polymer 14

Synthesis of Macroinitiator 14

Macroinitiator 14 was obtained by a similar method to the synthesis of macroinitiator 11 except that styrene was changed to methyl acrylate in the synthesis of macroinitiator 11.

Synthesis of Polymer 14

Polymer 14 was obtained by a similar method to the synthesis of polymer 11 except that macroinitiator 11 was changed to macroinitiator 14 in the synthesis of polymer 11.

Synthesis of Polymer 15

Synthesis of Macroinitiator 15

Macroinitiator 15 was obtained by a similar method to the synthesis of macroinitiator 11 except that styrene was changed to n-hexyl methacrylate in the synthesis of macroinitiator 11.

Synthesis of Polymer 15

Polymer 15 was obtained by a similar method to the synthesis of polymer 11 except that macroinitiator 11 was changed to macroinitiator 15 in the synthesis of polymer 11.

Synthesis of Polymer 16

Synthesis of macroinitiator 16

Macroinitiator 16 was obtained by a similar method to the synthesis of macroinitiator 11 except that styrene was changed to 3-methyl-1-pentene in the synthesis of macroinitiator 11.

Synthesis of Polymer 16

Polymer 16 was obtained by a similar method to the synthesis of polymer 11 except that macroinitiator 11 was changed to macroinitiator 16 in the synthesis of polymer 11.

Synthesis of Polymer 17

Synthesis of Macroinitiator 17

Macroinitiator 17 was obtained by a similar method to the synthesis of macroinitiator 11 except that styrene was changed to a mixture having a styrene: methylacrylate molar ratio of 5:5 in the synthesis of macroinitiator 11.

Synthesis of Polymer 17

Polymer 17 was obtained by a similar method to the synthesis of polymer 11 except that macroinitiator 11 was changed to macroinitiator 17 in the synthesis of polymer 11.

Preparation of Compositions 1 to 25

Compounds 1, 2, 6, and 10 and polymers 1 to 3 and 5 to 18 prepared above were dissolved in an appropriate amount of THF at a ratio (mass ratio) illustrated in Table 3 below and dried to obtain compositions 1 to 25.

Table 3 below illustrates compounds and polymers constituting compositions 1 to 25. In Table 3, compounds 1, 2, 6, and 10 are compounds 1, 2, 6, and 10 in Table 1 above. Structural unit Nos. constituting polymers 1 to 3 and 5 to 18 correspond to structural unit Nos. in Table 2 above.

Preparation of Toner 1

Preparation of Composition Particle Dispersion 1

80 parts by mass of dichloromethane and 20 parts by mass of composition 1 obtained above were mixed and stirred while being heated at 50° C. to obtain a solution containing composition 1. To 100 parts by mass of the obtained solution, a mixed solution of 99.5 parts by mass of distilled water warmed to 50° C. and 0.5 parts by mass of a 20% by mass sodium dodecylbenzene sulfonate aqueous solution was added. Thereafter, the resulting mixture was stirred at 16000 rpm for 20 minutes with a homogenizer (manufactured by Heidolph Instruments) equipped with a shaft generator 18F and emulsified to obtain an emulsion of composition 1.

The obtained emulsion was put into a separable flask, and heated and stirred at 40° C. for 90 minutes while nitrogen was fed into a gas phase, and the organic solvent was removed to obtain composition particle dispersion 1. The particle diameter of a composition particle in composition particle dispersion 1 was measured using an electrophoretic light scattering photometer "ELS-800" (manufactured by Otsuka Electronics Co., Ltd.) and found to be 155 nm in terms of a mass average particle diameter.

(Preparation of Black Colorant Particle Dispersion (Bk-1)

11.5 parts by mass of sodium n-dodecyl sulfate was dissolved in 160 parts by mass of pure water, and 25 parts by mass of carbon black "MOGUL L (manufactured by Cabot Corporation)" was gradually added thereto. Subsequently, the resulting mixture was dispersed using "CLEAR-MIX (registered trademark) W Motion CLM-0.8 (manufactured by M Technique Co., Ltd.)" to prepare black colorant particle dispersion (Bk-1). The volume-based median diameter of colorant particles in black colorant particle dispersion (Bk-1) was 110 nm.

Preparation of Toner 1

Into a reaction device equipped with a stirrer, a temperature sensor, and a cooling tube, 602 parts by mass of composition particle dispersion 1 prepared above in terms of solid content, 52 parts by mass of black colorant particle dispersion (Bk-1) in terms of solid content, and 900 parts by mass of deionized water were put. The pH was adjusted to 10 by adding a 5 mol/liter sodium hydroxide aqueous solution while the temperature in the container was maintained at 30° C.

Next, an aqueous solution obtained by dissolving 2 parts by mass of magnesium chloride hexahydrate in 1000 parts by mass of deionized water was added dropwise thereto over 10 minutes while being stirred. Thereafter, the temperature of this system started to be raised, and this system was heated to 70° C. over 60 minutes. A particle growth reaction was continued while the temperature was maintained at 70° C. In this state, the particle diameter of an associated particle was measured with "Multisizer 3" (manufactured by Beckman Coulter. Inc.). When the volume-based median diameter (D50) reached 6.5 µm, an aqueous solution obtained by dissolving 190 parts by mass of sodium chloride in 760 parts by mass of deionized water was added thereto to stop the particle growth. The resulting solution was stirred at 70° C. for one hour. Thereafter, the temperature was further raised. The solution was heated and stirred at 75° C. to promote fusion of the particles. Thereafter, the solution was cooled to 30° C. to obtain a dispersion of toner matrix particles.

The obtained dispersion of toner matrix particles was subjected to solid-liquid separation with a centrifuge to form a wet cake of toner matrix particles. The wet cake was washed with deionized water at 35° C. using a centrifuge until the electric conductivity of a filtrate reached 5 pS/cm, then transferred to a "flash jet dryer" (manufactured by Seishin Enterprise Co., Ltd.), and dried until the water content reached 0.5% by mass to prepare toner matrix particles.

To 100% by mass of the obtained toner matrix particles, 1% by mass of hydrophobic silica (number average primary particle diameter=12 nm) and 0.3% by mass of hydrophobic titania (number average primary particle diameter=20 nm) were added and mixed using a Henschel mixer to obtain toner 1.

Preparation of Toners 2 to 23, 26, and 27, and Toners in Comparative Examples 1 and 2

Toners 2 to 23, 26, and 27 were obtained by a similar method to the preparation of toner 1 except that composition 1 was changed to compositions 2 to 25 in the preparation of toner 1, respectively. The toners in Comparative Examples 1 and 2 were prepared according to the compositions illustrated in Table 4 below.

Preparation of Toner 241

Toner 24 was obtained by a similar method to the preparation of toner 1 except that the amount of polymer particle dispersion 1 was changed from 602 parts by mass to 421 parts by mass in terms of solid content, and 181 parts by mass of the following styrene acrylic resin particle dispersion in terms of solid content was added in the preparation of toner 1.

Preparation of Styrene Acrylic Resin Particle Dispersion

First Stage Polymerization

Into a reaction container equipped with a stirrer, a temperature sensor, a cooling tube, and a nitrogen introducing device, a solution obtained by dissolving 8 parts by mass of sodium dodecylsulfate in 3000 parts by mass of deionized water was put. While the solution was stirred at a stirring speed of 230 rpm under a nitrogen flow, the internal temperature thereof was raised to 80° C. After the temperature rise, a solution obtained by dissolving 10 parts by mass of potassium persulfate in 200 parts by mass of deionized water was added thereto. The temperature of the resulting solution was set to 80° C. again. A polymerizable monomer solution containing 480 parts by mass of styrene, 250 parts by mass of n-butyl acrylate, 68.0 parts by mass of methacrylic acid, and 16.0 parts by mass of n-octyl-3-mercaptopropionate was added dropwise thereto over one hour. Thereafter, the resulting mixture was heated at 80° C. for two hours and stirred to perform polymerization, thus preparing a styrene acrylic resin particle dispersion (1A) containing styrene acrylic resin particles (1a).

Second Stage Polymerization

Into a reaction container equipped with a stirrer, a temperature sensor, a cooling tube, and a nitrogen introducing device, a solution obtained by dissolving 7 parts by mass of sodium polyoxyethylene (2) dodecyl ether sulfate in 800 parts by mass of deionized water was put. The solution was heated to 98° C. Thereafter, a polymerizable monomer solution obtained by dissolving 260 parts by mass of the styrene acrylic resin particle dispersion (1A) obtained above, 245 parts by mass of styrene, 120 parts by mass of n-butyl acrylate, 1.5 parts by mass of n-octyl-3-mercaptopropionate, and 67 parts by mass of a paraffin wax "HNP-11" (manufactured by Nippon Seiro Co., Ltd.) as a release agent at 90° C. was added thereto. The solution was mixed and dispersed for one hour with a mechanical disperser "CREARMIX (registered trademark)" (manufactured by M. Technique Co., Ltd.) having a circulation path to prepare a dispersion containing emulsified particles (oil droplets). Subsequently, an initiator solution obtained by dissolving 6 parts by mass of potassium persulfate in 200 parts by mass of deionized water was added to the dispersion, and the system was heated and stirred at 82° C. for one hour to perform polymerization, thus preparing a styrene acrylic resin particle dispersion (1B)—containing styrene acrylic resin particles (1b).

Third Stage Polymerization

To the obtained styrene acrylic resin particle dispersion (1B), a solution obtained by dissolving 11 parts by mass of potassium persulfate in 400 parts by mass of deionized water was added. Subsequently, under a temperature condition of 82° C., a polymerizable monomer solution containing 435 parts by mass of styrene, 130 parts by mass of n-butyl acrylate, 33 parts by mass of methacrylic acid, and 8 parts by mass of n-octyl 3-mercaptopropionate was added dropwise thereto over one hour. After completion of the dropwise addition, the resulting mixture was heated and stirred for two hours to perform polymerization and then cooled to 28° C. to obtain a styrene acrylic resin particle dispersion containing a styrene acrylic resin 1.

Preparation of Toner 25

Toner 25 was obtained by a similar method to the preparation of toner 1 except that the amount of polymer particle dispersion 1 was changed from 602 parts by mass to 421 parts by mass in terms of solid content, and 181 parts by mass of the following polyester resin particle dispersion in terms of solid content was added in the preparation of toner 1.

Preparation of Polyester Resin Particle Dispersion Containing Polyester Resin Into a 10 liter four-neck flask equipped with a nitrogen introducing tube, a dehydration tube, a stirrer, and a thermocouple, 524 parts by mass of bisphenol A propylene oxide 2 mol adduct, 105 parts by mass of terephthalic acid, 69 parts by mass of fumaric acid, and 2 parts by mass of tin octylate (esterification catalyst) were put, and were subjected to a polycondensation reaction at a temperature of 230° C. for eight hours. Furthermore, the polycondensation reaction was continued at 8 kPa for one hour, and then cooled to 160° C. to obtain polyester resin 1. 100 parts by mass of polyester resin 1 was crushed with "Lander mill type: RM" (manufactured by Tokuju Corporation) and mixed with 638 parts by mass of a 0.26% by mass of a sodium lauryl sulfate aqueous solution prepared in advance. The resulting mixture was ultrasonically dispersed at V-LEVEL at 300 µA for 30 minutes using a homogenizer "US-150T" (manufactured by Nihonseiki Kaisha Ltd.) while being stirred to obtain a polyester resin particle dispersion. The particle diameters of the polyester resin particles in the polyester resin particle dispersion were measured by a dynamic light scattering method using "Microtrac UPA-150" (manufactured by Nikkiso Co., Ltd.) and found to be 135 nm in terms of volume-based median diameter.

(Number Average Molecular Weight Mn)

The number average molecular weights Mn of polymers 1 to 3 and 5 to 18 prepared above were measured by the GPC method. Specifically, tetrahydrofuran (THF) was caused to flow as a carrier solvent at a flow rate of 0.2 mL/min while a column temperature was maintained at 40° C. using a device "HLC-8120GPC" (manufactured by Tosoh Corporation) and a column "TSK guard column+TSK gel Super HZ-M triplicate" (manufactured by Tosoh Corporation). A measurement sample was dissolved in tetrahydrofuran so as to have a concentration of 1 mg/ml. The solution was prepared by performing a treatment at room temperature for five minutes using an ultrasonic disperser. Subsequently, the solution was treated with a membrane filter with a pore size of 0.2 µm to obtain a sample solution. Thereafter, 10 µL of the sample solution was injected into the device together with the carrier solvent and detected using a refractive index detector (RI detector). Based on a calibration curve created using monodispersed polystyrene standard particles, a molecular weight distribution of the measurement sample was calculated. Ten points were used as polystyrene for the calibration curve measurement.

Note that for each of polymers 10 to 17, in addition to the total number average molecular weight, the number average molecular weight of a macroinitiator was also measured by the above method. By defining the number average molecular weight of a macroinitiator as the number average molecular weight of the polymer block α or β, and subtracting (number average molecular weight of the macroinitiator×number of blocks) from the total number average molecular weight of a polymer for each block structure, the sum of number average molecular weights of the other polymer blocks (number average molecular weight of the other polymer block×number of blocks) was obtained. Results thereof are illustrated in Table 3 below. In Table 3, Mn represents the total number average molecular weight of a polymer, αMn represents the sum of number average molecular weights of the polymer blocks α, and βMn represents the sum of number average molecular weights of the polymer blocks β.

Evaluation: Photoresponsive Adhesion Test of Composition

Figure 3:
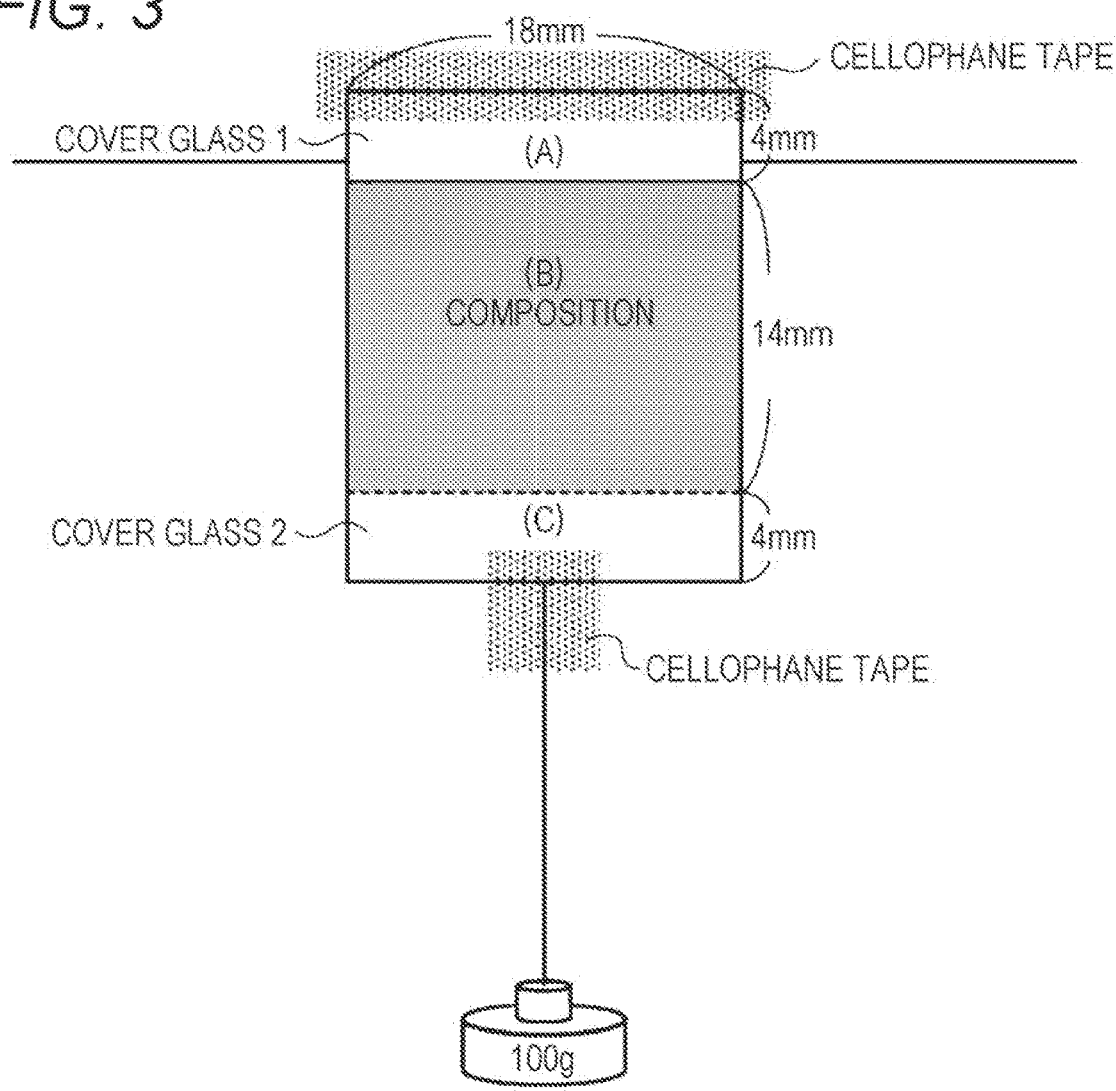
FIG. 3 is a schematic diagram of an apparatus for measuring a change in adhesiveness of a composition used in a photoresponsive adhesion test in Examples due to light irradiation.

A change in adhesiveness of each of compositions 1 to 25 prepared in Examples due to light irradiation was evaluated by the following photoresponsive adhesion test using the apparatus illustrated in FIG. 3. As illustrated in FIG. 3, 2 mg of each of the compositions was placed on 18 mm square cover glass 1 within a radius of 6 mm from the center of the glass, and each of the compositions was covered with cover glass 2 having the same size as the cover glass 1 at a position displaced by about 4 mm in a direction parallel to cover glass 1. The sample thus obtained was heated to melt the sample, and cover glass 1 and cover glass 2 were bonded to each other. Each of the obtained samples was subjected to the following non-fluidity→fluidity test, and then subjected to the following fluidity→non-fluidity test.

<Non-Fluidity→Fluidity Test (Fluidization Test)>

The portion (A) illustrated in FIG. 3 was fixed to a table with a cellophane tape, and a vinyl string having a length of 30 cm with a 100 g weigh was fixed to the portion (C) with a cellophane tape. The portion (B) was irradiated with light having a wavelength of 365 nm at an irradiation amount of 30 J/cm$^2$. It was confirmed whether cover glass 2 was peeled off from cover glass 1, and judgement was made according to the following evaluation criteria.

Evaluation Criteria of Non-Fluidity→Fluidity Test (Fluidization Test)

O: Cover glass 2 has been completely peeled off from cover glass 1.
Δ: Cover glass 2 has been displaced.
x: Cover glass 2 has not moved.

Fluidity→Non-Fluidity Test (Non-Fluidization Test)

After completion of the non-fluidity→fluidity test, the following experiment was performed on a sample in which cover glass 2 had been completely peeled off and a sample in which cover glass 2 had been displaced. Note that for the sample in which cover glass 2 had been displaced, cover glasses 1 and 2 were peeled off by hand. Five minutes after completion of light irradiation in the non-fluidity→fluidity test (the samples were left at room temperature (within a range of 25±15° C.) and under visible light irradiation such as fluorescent light for five minutes), cover glass 3 (having the same size as cover glasses 1 and 2) was placed so as to cover a sample portion (portion (B)) of cover glass 1 used in the test. It was confirmed whether cover glass 1 and cover glass 3 were bonded to each other, and judgment was made according to the following evaluation criteria.

Evaluation Criteria of Fluidity→Non-Fluidity Test (Non-Fluidization Test)

○: Not bonded (non-fluidized)
Δ: Partially bonded (partially kept in a fluidized state)
x: Bonded (kept in a fluidized state).

Compositions 1 to 25 each containing an isomerized polymer and an isomerized low molecular weight compound had evaluation results of O in the fluidization test and the non-fluidization test, and it was confirmed that compositions 1 to 25 were fluidized by light irradiation and reversibly non-fluidized.

Evaluation: Fixability Test

Preparation of Developer

Ferrite carrier particles coated with a copolymer resin of cyclohexane methacrylate and methyl methacrylate (monomer mass ratio 1:1) and having a volume average particle diameter of 30 μm were mixed with each of toners 1 to 27 prepared above and the toners in Comparative Examples 1 and 2 such that a toner particle had a concentration of 6% by mass to obtain each of developers 1 to 27 and developers in Comparative Examples 1 and 2. Mixing was performed for 30 minutes using a V-type mixer.

(Fixability Test)

A fixability test was performed in a normal temperature and humidity environment (temperature 20° C., relative humidity 50% RH) using developers 1 to 27 obtained above and the developers in Comparative Examples 1 and 2. Specifically, each of the developers was disposed between a pair of parallel flat plate (aluminum) electrodes with the developer on one side and plain paper (basis weight: 64 g/m$^2$) as a recording medium on the other side while being slid by a magnetic force. A toner was developed under a condition that a gap between the electrodes was 0.5 mm and the toner attachment amount in each of a DC bias and an AC bias was 6 g/m$^2$. A toner image was formed on a surface of the plain paper and fixed with a fixing device to obtain a printed matter (image formation).

The printed matter was folded with a folding machine such that a load was applied to the printed matter, and then 0.45 MPa compressed air was blown onto the image portion. A crease was ranked according to the following evaluation criteria, and rank 3 or higher was evaluated to be allowable.
6: No crease
5: Peeling is slightly observed along a crease
4: Peeling is partially observed along a crease
3: Fine linear peeling is observed along a crease
2: Thick linear peeling is observed along a crease
1: Peeling is significantly observed along a crease As the fixing device, the following four types of fixing devices obtained by appropriately modifying the device illustrated in FIG. 2 were used:

No. 1: A fixing device not including the pressure bonding unit 9 in FIG. 2, in which the temperature of the heating member 93 is 20° C., the light source 41 emits an ultraviolet ray having a wavelength of 365 nm (light source: LED light source with emission wavelength of 365 nm±10 nm), and the irradiation amount thereof is 7 J/cm$^2$ or 11 J/cm$^2$;

No. 2: A fixing device including the pressure bonding unit 9 in FIG. 2, in which the temperature of the heating member 93 is 20° C., the temperature of the pressurizing member 91 is 20° C., the pressurizing member 91 applies a pressure of 0.2 MPa at the time of pressurization, and the wavelength and the irradiation amount of the light source 41 are similar to those of No. 1.

No. 3: A fixing device including the pressure bonding unit 9 in FIG. 2, in which the temperature of the heating member 93 is 20° C., the temperature of the pressurizing member 91 is 80° C., the pressurizing member 91 applies a pressure of 0.2 MPa at the time of pressurization, and the wavelength and the irradiation amount of the light source 41 are similar to those of No. 1.

No. 4: A fixing device not including the pressure bonding unit 9 in FIG. 2, in which the temperature of the heating member 93 is 80° C., and the wavelength and the irradiation amount of the light source 41 are similar to those of No. 1.

[Color Reproducibility Evaluation]

For the images of Examples and Comparative Examples obtained above, color reproducibility was evaluated according to the following evaluation criteria by visual evaluation of 10 monitors. Specifically, as an evaluation comparison sample, a toner in which polymer 1 was changed to a styrene acrylic resin in Example 1 was prepared.

Using this toner, a developer was prepared in a similar manner to the above, development was performed in a similar manner to the image formation in the above fixability test, and fixing was performed with the following fixing device No. 5:

Fixing device No. 5: A fixing device including the pressure bonding unit 9 in FIG. 2, in which the temperature of the heating member 93 is 20° C., the temperature of the pressurizing member 91 is 150° C., the pressurizing member 91 applies a pressure of 0.2 MPa at the time of pressurization, and light irradiation is not performed.

The 10 monitors were shown the evaluation comparison sample and each of the images obtained in Examples and Comparative Examples in order, and were asked whether the colors of the two images were clearly different. Judgment results based on the following color reproducibility evaluation criteria are illustrated in Table 4 below:

Evaluation Criteria for Color Reproducibility

⊙: Two or less monitors answered that they were clearly different.
○: Three or four monitors answered that they were clearly different.
Δ: Five to seven monitors answered that they were clearly different.
x: Eight or more monitors answered that they were clearly different.

Results thereof are illustrated in Tables 3 and 4 below.

TABLE 3

| | | | | Polymer | | | | | | Compound | |
|---|---|---|---|---|---|---|---|---|---|---|---|
| | | | | Structural unit α containing isomerized structure | | Other structural unit β | | | | | |
| | Composition No. | Polymer No. | Polymer structure | Structural unit No. | αMn | Type | βMn | Mn | Mass ratio | Compound No. | Mass ratio |
| Example 1 | 1 | 1 | Homopolymer | 1 | — | — | — | 12000 | 50 | 1 | 50 |
| Example 2 | 2 | 1 | Homopolymer | 1 | — | — | — | 12000 | 50 | 2 | 50 |
| Example 3 | 3 | 3 | Homopolymer | 3 | — | — | — | 7000 | 50 | 2 | 50 |
| Example 4 | 4 | 5 | Homopolymer | 5 | — | — | — | 12000 | 50 | 6 | 50 |
| Example 5 | 5 | 5 | Homopolymer | 5 | — | — | — | 12000 | 50 | 1 | 50 |
| Example 6 | 6 | 1 | Homopolymer | 1 | — | — | — | 12000 | 50 | 6 | 10 |
| Example 7 | 7 | 1 | Homopolymer | 1 | — | — | — | 12000 | 90 | 1 | 90 |
| Example 8 | 8 | 1 | Homopolymer | 1 | — | — | — | 12000 | 10 | 1 | 30 |
| Example 9 | 9 | 1 | Homopolymer | 1 | — | — | — | 12000 | 70 | 1 | 70 |
| Example 10 | 10 | 1 | Homopolymer | 1 | — | — | — | 12000 | 30 | 1 | 50 |
| Example 11 | 11 | 2 | Homopolymer | 2 | — | — | — | 28000 | 50 | 1 | 50 |
| Example 12 | 12 | 6 | Random copolymer | 1 | — | St | — | 8100 | 50 | 1 | 50 |
| Example 13 | 13 | 7 | Random copolymer | 1 | — | EA | — | 32000 | 50 | 1 | 50 |
| Example 14 | 14 | 8 | Random copolymer | 1 | — | nBMA | — | 6500 | 50 | 1 | 50 |
| Example 15 | 15 | 9 | Random copolymer | 1 | — | St/MA | — | 11000 | 50 | 1 | 50 |
| Example 16 | 16 | 10 | Block copolymer α-β | 1 | 4500 | St | 1100 | 5600 | 50 | 1 | 50 |
| Example 17 | 17 | 11 | Block copolymer 2α-β | 1 | 10000 | St | 9000 | 19000 | 50 | 1 | 50 |
| Example 18 | 18 | 12 | Block copolymer α-2β | 1 | 10000 | St | 14000 | 24000 | 50 | 1 | 50 |
| Example 19 | 19 | 13 | Block copolymer α-β | 1 | 500 | St | 7000 | 7500 | 50 | 1 | 50 |
| Example 20 | 20 | 14 | Block copolymer 2α-β | 1 | 3700 | MA | 6100 | 9800 | 50 | 1 | 50 |
| Example 21 | 21 | 15 | Block copolymer 2α-β | 1 | 11000 | nHMA | 14000 | 25000 | 50 | 1 | 50 |
| Example 22 | 22 | 16 | Block copolymer 2α-β | 1 | 9000 | 3MPe | 5000 | 14000 | 50 | 1 | 50 |
| Example 23 | 23 | 17 | Block copolymer 2α-β | 1 | 4300 | St/MA | 4300 | 8600 | 50 | 1 | 50 |
| Example 24 | 24 | 18 | Homopolymer | 18 | — | — | — | 9500 | 50 | 10 | 50 |
| Example 25 | 25 | 18 | Homopolymer | 18 | — | — | — | 9500 | 50 | 1 | 50 |

St: Styrene, EA: Ethyl acrylate, nBMA: n-Butyl methacrylate, MA: Methyl acrylate, nHMA: n-Hexyl methacrylate, 3MPe: 3-Methyl-1-pentene

TABLE 4

| | | Composition | | Binder resin | | Fixing | Fixability evaluation (folding test) | | Color |
|---|---|---|---|---|---|---|---|---|---|
| | Toner No. | Composition No. | Ratio (% by mass) | Type | Ratio (% by mass) | device No. | 7 J/cm$_2$ | 11 J/cm$_2$ | reproducibility |
| Example 1 | 1 | 1 | 100 | — | — | 1 | 5 | 5 | ⊙ |
| Example 2 | 2 | 2 | 100 | — | — | 1 | 5 | 5 | ⊙ |
| Example 3 | 3 | 3 | 100 | — | — | 1 | 5 | 5 | ⊙ |
| Example 4 | 4 | 4 | 100 | — | — | 1 | 5 | 5 | X |
| Example 5 | 5 | 5 | 100 | — | — | 1 | 5 | 5 | X |
| Example 6 | 6 | 6 | 100 | — | — | 1 | 5 | 5 | X |
| Example 7 | 7 | 7 | 100 | — | — | 1 | 4 | 5 | ⊙ |
| Example 8 | 8 | 8 | 100 | — | — | 1 | 3 | 4 | ⊙ |
| Example 9 | 9 | 9 | 100 | — | — | 1 | 5 | 5 | ⊙ |
| Example 10 | 10 | 10 | 100 | — | — | 1 | 4 | 5 | ⊙ |
| Example 11 | 11 | 11 | 100 | — | — | 1 | 4 | 5 | ⊙ |
| Example 12 | 12 | 12 | 100 | — | — | 1 | 4 | 5 | ⊙ |
| Example 13 | 13 | 13 | 100 | — | — | 1 | 4 | 5 | ⊙ |
| Example 14 | 14 | 14 | 100 | — | — | 1 | 4 | 5 | ⊙ |
| Example 15 | 15 | 15 | 100 | — | — | 1 | 4 | 5 | ⊙ |
| Example 16 | 16 | 16 | 100 | — | — | 1 | 5 | 5 | ⊙ |
| Example 17 | 17 | 17 | 100 | — | — | 1 | 5 | 5 | ⊙ |
| Example 18 | 18 | 18 | 100 | — | — | 1 | 5 | 5 | ⊙ |
| Example 19 | 19 | 19 | 100 | — | — | 1 | 4 | 5 | ⊙ |
| Example 20 | 20 | 20 | 100 | — | — | 1 | 5 | 5 | ⊙ |
| Example 21 | 21 | 21 | 100 | — | — | 1 | 5 | 5 | ⊙ |
| Example 22 | 22 | 22 | 100 | — | — | 1 | 5 | 5 | ⊙ |
| Example 23 | 23 | 23 | 100 | — | — | 1 | 5 | 5 | ⊙ |
| Example 24 | 24 | 1 | 70 | Styrene acrylic | 30 | 1 | 3 | 4 | ⊙ |
| Example 25 | 25 | 1 | 70 | Polyester | 30 | 1 | 3 | 4 | ⊙ |
| Example 26 | 1 | 1 | 100 | — | — | 2 | 6 | 6 | ⊙ |
| Example 27 | 1 | 1 | 100 | — | — | 3 | 6 | 6 | ⊙ |
| Example 28 | 1 | 1 | 100 | — | — | 4 | 6 | 6 | ⊙ |
| Example 29 | 26 | 24 | 100 | — | — | 1 | 5 | 5 | ⊙ |
| Example 30 | 27 | 25 | 100 | — | — | 1 | 5 | 5 | ⊙ |

TABLE 4-continued

| Toner No. | Composition | | | Binder resin | | Fixing device No. | Fixability evaluation (folding test) | | Color reproducibility |
|---|---|---|---|---|---|---|---|---|---|
| | Composition No. | Ratio (% by mass) | Type | | Ratio (% by mass) | | 7 J/cm$_2$ | 11 J/cm$_2$ | |
| Comparative Example 1 | Comparative Example 1 | Polymer 5 100 | — | | — | 1 | 2 | 3 | X |
| Comparative Example 2 | Comparative Example 2 | Compound 6 100 | — | | — | 1 | 1 | 2 | X |

As illustrated in Table 4, all of toners 1 to 27 each using the composition according to an embodiment of the present invention could be fixed by light irradiation and exhibited high fixability.

Toners 1 to 3, 26, and 27 using compositions 1 to 3, 24, and 25 each containing a polymer containing a structural unit derived from an azomethine derivative and an azomethine compound, toner 4 using composition 4 containing a polymer containing a structural unit derived from an azobenzene derivative and an azobenzene compound, toner 5 using composition 5 containing a polymer containing a structural unit derived from an azobenzene derivative and an azomethine compound, and toner 6 using composition 6 containing a polymer containing a structural unit derived from an azomethine derivative and an azobenzene compound all exhibited high fixability by light irradiation.

Meanwhile, as in Comparative Examples 1 and 2, the toner prepared only with polymer 5 or compound 6 had insufficient fixability. In particular, it was found that the fixability was low when the light irradiation amount was low. From this finding, it was confirmed that by using a polymer and a compound in combination, fixing could be performed with a lower light irradiation amount than in a case where each of the polymer and the compound was used singly.

It was found that toners 1 to 6 using compositions 1 to 6 in each of which a structural unit in a polymer contained a phenylene group having a linker moiety to a polymer main chain at a para position with respect to a nitrogen-nitrogen double bond or a carbon-nitrogen double bond of an azobenzene derivative or an azomethine derivative, and an azobenzene compound or an azomethine compound contained a phenyl group having an alkyl group having 1 to 18 carbon atoms or an alkoxy group having 1 to 18 carbon atoms at a para position with respect to a nitrogen-nitrogen double bond or a nitrogen-carbon double bond had better fixability at a low irradiation amount than toner 11 using composition 11 containing polymer 2 containing a phenylene group having a linker moiety at a meta position.

Favorable fixability was obtained in all the cases where a mixing ratio between a polymer and a compound in a composition was within a range of polymer: compound=99:1 to 10:90 (mass ratio) (Examples 1 and 7 to 10). Above all, it was found that the fixability was better within a range of polymer: compound=30:70 to 90:10, and the fixability was still better within a range of polymer: compound=40:60 to 80:20.

When any of a homopolymer, a random copolymer, and a block copolymer was used as a polymer, good fixability was obtained. Above all, toners 1 to 6, 16 to 18, 20 to 23, 26, and 27 each using a composition using a homopolymer or a block copolymer as a polymer tend to have better fixability at a low irradiation amount than toners 12 to 15 each using a random copolymer. When a polymer has a number average molecular weight of 3500 or more, and is a block copolymer, better fixability can be obtained in a case where the sum of number average molecular weights of polymer blocks α is 1000 or more, and the sum of number average molecular weights of polymer blocks β is 1000 or more.

Not only a composition but also a binder resin can be further contained in a toner. It was confirmed that favorable fixability could be obtained similarly when the binder resin was further used as in toners 24 and 25.

When comparison was made among the fixing devices, in a case where the same toner 1 was used and an ultraviolet ray was emitted under the same conditions, it was found that by using the No. 2 fixing device that performed a pressurization with a pressurizing member, and furthermore, by using the No. 3 fixing device that performed a pressurization while performing heating with a pressurizing member, higher fixability could be obtained than by using the No. 1 fixing device that did not use a pressurizing member (comparison among Examples 1, 26, and 27). In addition, in a case where the same toner 1 was used and an ultraviolet ray was emitted under the same conditions, by using the No. 4 device that performed heating with the heating member 93, higher fixability could be obtained than by using the No. 1 fixing device that did not perform heating during irradiation with an ultraviolet ray (Examples 1 and 28).

In addition, it was found that toners 1 to 3 and 7 to 27 using compositions 1 to 3 and 7 to 25 each containing a polymer containing a structural unit derived from an azomethine derivative and an azomethine compound had excellent color reproducibility.

Although embodiments of the present invention have been described and illustrated in detail, the disclosed embodiments are made for purposes of illustration and example only and not limitation. The scope of the present invention should be interpreted by terms of the appended claims.

What is claimed is:

1. A composition comprising an isomerizable polymer containing a structural unit containing an isomerizable structure and an isomerizable low molecular weight compound, the composition being fluidized by light irradiation from a solid state and being reversibly non-fluidized,
    wherein the isomerizable polymer is a polymer containing a structural unit derived from an azomethine derivative, and the isomerizable low molecular weight compound is an azomethine compound.

2. The composition according to claim 1, wherein
    the azomethine derivative has a phenylene group having a linker moiety to a polymer main chain at a para position with respect to a carbon-nitrogen double bond, and
    the azomethine compound has a phenyl group having an alkyl group having 1 to 18 carbon atoms or an alkoxy group having 1 to 18 carbon atoms at a para position with respect to a nitrogen-carbon double bond.

3. The composition according to claim 1, wherein a mixing ratio between the isomerizable polymer and the isomerizable low molecular weight compound is within a range of isomerizable polymer: isomerizable low molecular weight compound=99:1 to 10:90 in terms of mass ratio.

4. The composition according to claim 1, wherein the light has a wavelength of 280 nm or more and 480 nm or less.

5. A toner comprising the composition according to claim 1.

6. The toner according to claim 5, further comprising a binder resin.

7. The toner according to claim 6, wherein the binder resin contains at least one selected from the group consisting of a styrene acrylic resin and a polyester resin.

8. A photoresponsive adhesive comprising the composition according to claim 1.

9. An optical switching material comprising the composition according to claim 1.

10. An image forming method comprising:
  forming a toner image containing the toner according to claim 5 on a recording medium; and
  irradiating the toner image with light to soften the toner image.

11. The image forming method according to claim 10, wherein
  the light has a wavelength of 280 nm or more and 480 nm or less.

12. The image forming method according to claim 10, further comprising pressurizing the toner image.

13. The image forming method according to claim 12, wherein
  the toner image is further heated in pressurizing the toner image.

14. The image forming method according to claim 10, wherein the toner image is heated under light irradiation in irradiating the toner image with light to soften the toner image.

* * * * *